United States Patent
Fujioka et al.

(10) Patent No.: US 11,932,543 B2
(45) Date of Patent: Mar. 19, 2024

(54) COMPOSITE OXIDE POWDER AND METHOD FOR PRODUCTION THEREOF

(71) Applicant: Tokuyama Corporation, Shunan (JP)

(72) Inventors: Hiromasa Fujioka, Shunan (JP); Hiroaki Taira, Shunan (JP); Osamu Tanaka, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 794 days.

(21) Appl. No.: 16/978,299

(22) PCT Filed: Mar. 13, 2019

(86) PCT No.: PCT/JP2019/010218
§ 371 (c)(1),
(2) Date: Sep. 4, 2020

(87) PCT Pub. No.: WO2019/177004
PCT Pub. Date: Sep. 19, 2019

(65) Prior Publication Data
US 2021/0009432 A1   Jan. 14, 2021

(30) Foreign Application Priority Data

Mar. 15, 2018 (JP) .................... 2018-047435
Feb. 26, 2019 (JP) .................... 2019-033177

(51) Int. Cl.
*C01B 33/20* (2006.01)
*C01B 13/36* (2006.01)
(Continued)

(52) U.S. Cl.
CPC ............. *C01B 33/20* (2013.01); *C08K 3/34* (2013.01); *C08K 9/06* (2013.01); *C09C 1/3081* (2013.01);
(Continued)

(58) Field of Classification Search
CPC . C08K 3/34; C08K 2201/005; C01P 2004/61; C01P 2004/62; C01B 13/363
See application file for complete search history.

(56) References Cited

U.S. PATENT DOCUMENTS

2003/0133890 A1   7/2003   Kato et al.
2009/0042121 A1   2/2009   Toizumi et al.
(Continued)

FOREIGN PATENT DOCUMENTS

CN   102762498 A   10/2012
CN   105408252 A   3/2016
(Continued)

OTHER PUBLICATIONS

Database WPI Week 201840 (3 pages).
(Continued)

*Primary Examiner* — Kregg T Brooks
*Assistant Examiner* — David R. Foss
(74) *Attorney, Agent, or Firm* — ALSTON & BIRD LLP

(57) ABSTRACT

Composite oxide fine particles are produced by sol-gel method under conditions in which coarse particles and aggregated particles are unlikely to be generated, and the composite oxide fine particles are further wet-filtered using a filter to remove the coarse particles and the aggregated particles. Then, a salt is added to a dispersion of the composite oxide fine particles to produce weak aggregates of the composite oxide fine particles in the dispersion. A solid content is separated from the dispersion of the composite oxide fine particles containing the aggregates, and then dried. The solid content is easily made finer because no firm aggregates are generated during the drying. That is, composite oxide fine particles containing no coarse particles and aggregated particles are obtained. Use of a known cracking means can further reduce the amount of coarse particles.

4 Claims, 1 Drawing Sheet

(51) Int. Cl.
  *C08K 3/34* (2006.01)
  *C08K 9/06* (2006.01)
  *C09C 1/30* (2006.01)
  *C09C 1/36* (2006.01)
(52) U.S. Cl.
  CPC .............. *C09C 1/36* (2013.01); *C01B 13/363* (2013.01); *C01P 2004/61* (2013.01); *C01P 2004/62* (2013.01); *C08K 2003/343* (2013.01); *C08K 2201/005* (2013.01)

(56) References Cited

U.S. PATENT DOCUMENTS

| | | |
|---|---|---|
| 2012/0237673 A1 | 9/2012 | Kuniyasu et al. |
| 2012/0323030 A1 | 12/2012 | Maehara et al. |
| 2015/0056119 A1 | 2/2015 | Maehara et al. |
| 2016/0159654 A1 | 6/2016 | Muraguchi et al. |
| 2020/0199371 A1 | 6/2020 | Fujioka et al. |

FOREIGN PATENT DOCUMENTS

| | | |
|---|---|---|
| EP | 1323673 A2 | 7/2003 |
| EP | 2537804 A1 | 12/2012 |
| JP | S60-42218 A | 3/1985 |
| JP | 2003-055601 A | 2/2003 |
| JP | 2003-252616 A | 9/2003 |
| JP | 2007-230789 | 9/2007 |
| JP | 2007-230789 A | 9/2007 |
| JP | 2009-42571 A | 2/2009 |
| JP | 2012-006823 A | 1/2012 |
| JP | 2012-187563 | 10/2012 |
| JP | 2013-249215 A | 12/2013 |
| JP | 2016-190770 A | 11/2016 |
| TW | 200301221 A | 7/2003 |
| TW | 201144226 A | 12/2011 |
| WO | WO-2015/016359 A1 | 2/2015 |

OTHER PUBLICATIONS

Extended European Search Report for European Application No. 19766515.1 dated Sep. 29, 2021 (9 pages).
Database WPI-1 (3 pages).
International Searching Authority, International Search Report and Written Opinion for International Application No. PCT/JP2019/010218, dated Jun. 11, 2019, (10 pages), Japanese Patent Office, Tokyo, Japan.

COMPOSITE OXIDE POWDER AND METHOD FOR PRODUCTION THEREOF

CROSS REFERENCE TO RELATED APPLICATIONS

This application is a national stage application, filed under 35 U.S.C. § 371, of International Application No. PCT/JP2019/010218, filed Mar. 13, 2019, which international application claims priority to both Japanese Application No. 2018-047435, filed Mar. 15, 2018, and Japanese Application No. 2019-033177, filed Feb. 26, 2019; the contents of all of which as are hereby incorporated by reference in their entireties.

BACKGROUND

Technical Field

The present invention relates to a silica-based composite oxide powder that is suitably usable as a filler for adhesives, an antiblocking agent for films, light scattering particles, hard coatings, and dental materials. In particular, the present invention relates to silica-based composite oxide powder containing a trace amount of coarse particles.

Description of Related Art

Various inorganic powders are blended as fillers into resin compositions for optical adhesives and films. Among them, silica-based composite oxide particles produced by sol-gel method, i.e., by compounding silica as a main component and various metal oxides, can exhibit various unique characteristics that cannot be obtained by using silica alone, and thus, have been used in various different applications. For example, with the change of the blending ratio between silica and metal oxides other than silica, a refractive index of the particles can be optionally controlled without impairing optical transparency. By using particles having the same refractive index as a resin as a filler, a favorable transparent composite resin can be obtained with improved characteristics, such as high mechanical strength and low thermal expansibility, while maintaining transparency. When the particles are formed as a coating on a film, or kneaded into a film, the film can be provided with an anti-blocking effect while maintaining transparency.

So far, materials having different blending proportions of metal oxides other than silica have been known. For example, Japanese Unexamined Patent Publication No. 2003-252616 discloses a composite oxide having a content of metal oxides other than silica of 30 mol % to 50 mol %. According to known methods, however, a relatively large amount of coarse particles and aggregated particles are contained in the resulting powder. For example, when such powder is used for the film, the coarse particles and aggregated particles cause defects, and reduce the yield. When the powder is used for optical adhesives and resin compositions, these particles deteriorate optical transparency.

When used for the film, the powder preferably contains no coarse particles and aggregates because they cause defects and scratches. In particular, with the recent trend toward greater screen size and higher definition of flat-panel displays, films for optical applications are required to have high transparency and substantially no defects. Thus, when used for the film, it is very important for the powder to control the content of the coarse particles and aggregates to be extremely low.

When the powder is added to a resin composition such as an adhesive, especially when the resin composition needs to flow through a narrow path like an underfill material for semiconductors, the coarse particles and the aggregates cause the resin composition to flow unevenly, resulting in voids and poor adhesion. Therefore, when used for various optical adhesives such as those for optical semiconductors, it is very important for the powder to control the content of coarse particles and aggregates to be extremely low for avoiding defective products.

According to Japanese Unexamined Patent Publication No. 2012-6823, a coagulant containing a certain compound is added to a silica particle dispersion obtained by sol-gel method so that the particles can be mildly aggregated without producing firm aggregates in a downstream step. The resulting product can be easily cracked into primary particles by the shear of a disperser used to disperse the particles into a resin.

Specifically, according to this method, if the sol-gel method is controlled so that silica shows good monodispersity, the aggregates generated in the downstream step can be easily cracked into the primary particles by a simple cracking process. Thus, the resulting silica powder contains substantially no coarse particles. This makes it possible to obtain silica powder in which no coarse particles having a particle diameter exceeding 5 μm is detected in a particle size distribution measurement at a general-purpose level, especially a measurement by a laser diffraction scattering method.

BRIEF SUMMARY

According to the results of measurement by the laser diffraction scattering method as described above, a silica powder and silica-titania composite oxide containing substantially no coarse particles have been obtained. However, even if such powder is used, problems such as defects and scratches, voids and poor adhesion still arise.

The inventors of the present invention have conducted earnest studies to solve the above problems. As a result, they have found that even if a sol-gel silica-based composite oxide powder is obtained in which the coarse particles as the aggregates are reduced to such a level that no coarse particles are detectable in the particle size distribution measurement by the laser diffraction scattering method, a significant amount of particles of 5 μm or more is detected in a measurement by the Coulter counter method having a higher detection sensitivity than the laser diffraction scattering method. Further, they have found that the coarse particles serve as an obstructive factor in acquiring quality required for fillers used for the optical materials.

Further studies have revealed that the coarse particles are not the aggregates produced in a downstream step such as drying, but are mainly coarse independent primary particles that are inevitably generated during the synthesis of the silica-based composite oxide by the sol-gel method, and that the coarse independent primary particles can be efficiently removed by wet filtration of a dispersion of silica particles synthesized by the sol-gel method. Thus, the inventors have proposed a novel sol-gel silica powder that does not involve the above-described problems.

Specifically, the present invention is directed to a silica-based composite oxide powder having a volume-based cumulative 50% diameter measured by a laser diffraction scattering method in a range of 5 μm to 2.0 μm, and a coefficient of variation of 40% or less, wherein in a 5 mass % dispersion of the silica-based composite oxide powder obtained by ultrasonic irradiation (at an output of 40 W for 10 minutes), a content of particles having a particle diameter of 5 μm or more in a particle size distribution obtained by a Coulter counter method is 10 ppm or less on a number basis.

The silica-based composite oxide powder of the present invention contains only a trace amount of coarse particles. Thus, in the production of molded products such as films of this powder blended, defects can be reduced.

When the powder is used as a filler for various optical adhesives such as those for optical semiconductors, the resulting product can have great ability to penetrate into narrow gaps. This can improve the productivity and yield of the intended members, which is very useful.

DETAILED DESCRIPTION OF VARIOUS EMBODIMENTS

Figure 1:
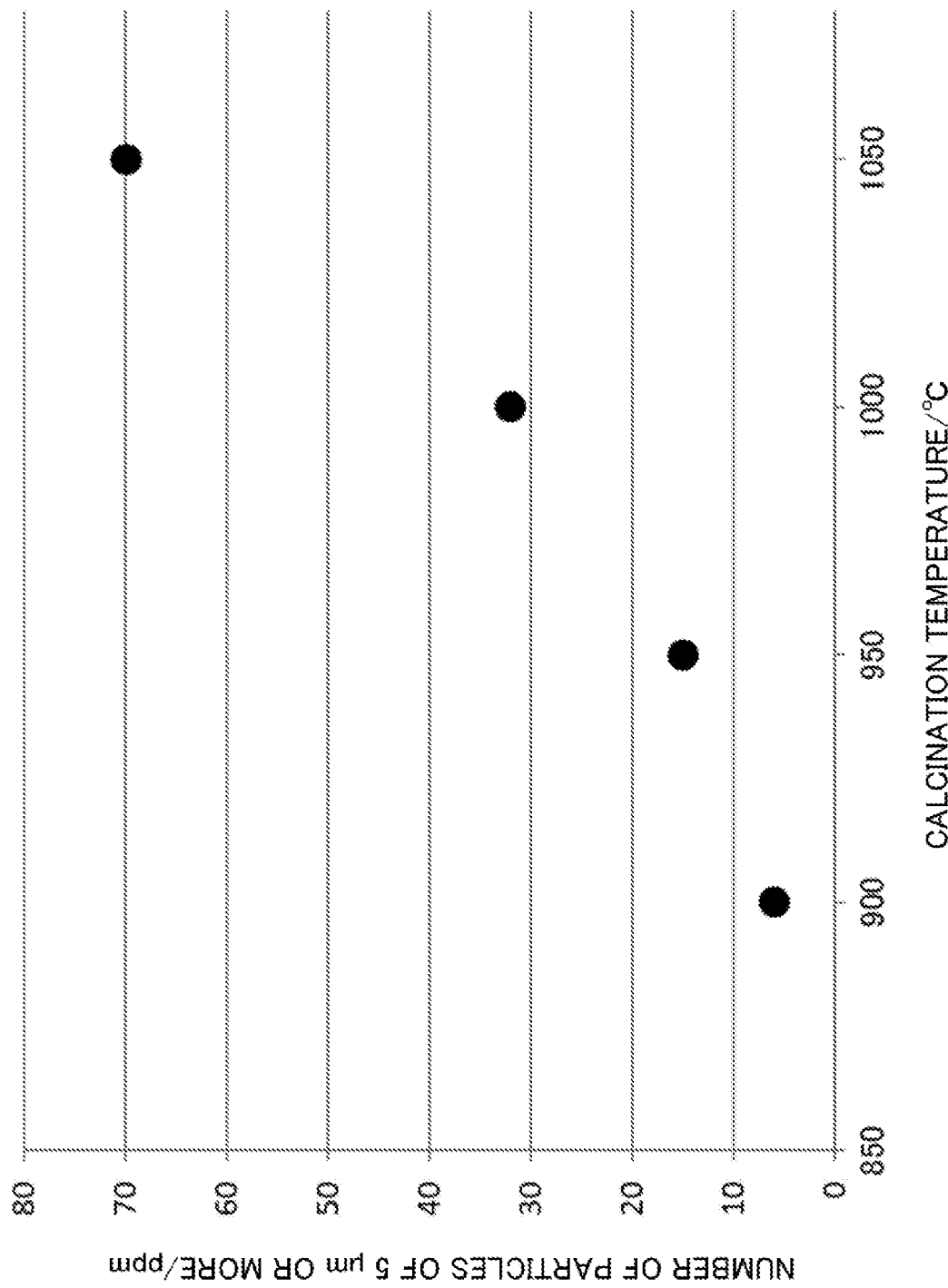
FIG. 1 is a graph illustrating a relationship between a calcination temperature of silica-based composite oxide and the amount of coarse particles of 5 μm or more.

Silica-based composite oxide powder of the present invention is comprised of composite oxide of silicon and at least one metal selected from the group consisting of titanium and zirconium.

In the present invention, titanium and zirconium may be solely combined with silica to produce silica-titania composite oxide particles and silica-zirconia composite oxide particles. Alternatively, silica, titania and zirconia may be combined together to produce a composite oxide. Specifically, particles of ternary silica-based composite oxide of silica-titania-zirconia may be produced.

In the silica-based composite oxide powder of the present invention, the proportion of titanium or zirconium to the total amount of metal is preferably 50 mol % or less. In this proportion, the powder obtained by a production method described later can keep its spherical shape with sufficient sphericity, and can reduce the possibility that the particles adhere to each other to increase the coarse particles. The proportion is more preferably 40 mol % or less, particularly 25 mol % or less. In order to provide the powder with a higher refractive index than silica, the proportion of titanium or zirconium is preferably 1 mol % or more, more preferably 3 mol % or more, particularly preferably 5 mol % or more.

In general, the silica-based composite oxide powder of the present invention is mostly amorphous, but may be a mixture of an amorphous component and a partially crystalline component. A powder produced by sol-gel method, which will be described later, is amorphous before calcination, and remains amorphous when calcined at a low temperature, but a metal oxide other than silica may become partially crystalline when the powder is calcined at a high temperature. In general, these properties can be analyzed by X-ray diffraction. If an attempt is made to use the optically transparent property of the particles, in general, it is preferable that the particles are amorphous, or only some of the particles are crystalline.

The silica-based composite oxide powder of the present invention has a volume-based cumulative 50% diameter measured by the laser diffraction scattering method (hereinafter, referred to as a "mean particle diameter") in the range of 0.05 μm to 2 μm. The mean particle diameter is preferably 0.1 μm to 1.5 μm, more preferably 0.15 μm to 1 μm, particularly preferably 0.25 μm to 0.8 μm. When the mean particle diameter is greater than 2 μm, aggregates cannot be easily reduced with accuracy, and particles having a diameter of 5 μm or more increase. In general, particles having a small diameter and a larger specific surface area are apt to aggregate when dried. Thus, when the mean particle diameter is smaller than 0.05 μm, it is difficult to keep the particles from aggregating, and the aggregates produced cannot be easily cracked. As a result, the particles having a particle diameter of 5 μm or more increase. When the particles of such a small diameter are introduced into a resin, the resin increases in viscosity to decrease its fluidity.

Further, in a 5 mass % dispersion of the silica-based composite oxide powder of the present invention obtained by ultrasonic irradiation (at an output of 40 W for 10 minutes), the proportion (ppm) of coarse particles having a particle diameter of 5 μm or more to the total number of particles measured by the Coulter counter method (aperture diameter: 30 μm) is 10 ppm or less. The proportion is preferably 5 ppm or less. As a dispersion medium, distilled water is used if the powder is not surface-treated, and ethanol is used if the powder is surface-treated.

Unless otherwise specified, regarding the coarse particles of 5 μm or more or 3 μm or more described hereinafter, the particle diameter is measured by the Coulter counter method.

Even if the silica-based composite oxide powder of the present invention contains aggregates, the aggregates can be favorably cracked because the particles are weakly aggregated. Thus, in the 5 mass % dispersion of the silica-based composite oxide powder, the weak aggregates can be cracked into primary particles by ultrasonic irradiation at an output of 40 W for 10 minutes. The fact that the aggregates can be cracked under these conditions indicates that the aggregates can be easily cracked by, for example, the shear of a disperser used for dispersing the powder into a resin or a solvent.

If the amount of coarse particles of 5 μm or more in the 5 mass % ultrasonic dispersion of the silica-based composite oxide powder exceeds the above-described value, a resin composition to which the ultrasonic dispersion is blended decreases in fluidity. When this resin composition is injected into a narrow gap, e.g., like a capillary underfill material for semiconductors, the resin composition does not smoothly penetrate into the gap due to the coarse particles, making the resin composition in the gap inhomogeneous. Further, when the powder is used for films, the coarse particles may cause scratches and defects.

For the same reasons, the amount of coarse particles of 3 μm or more is preferably 50 ppm or less, more preferably 30 ppm or less, still more preferably 10 ppm or less, and particularly preferably 5 ppm or less. In either case, the amount of coarse particles is measured by the Coulter counter method from five samples, and approximately 50,000 particles are measured from each sample, i.e., approximately 250,000 particles in total are measured from the five samples. Among them, the number of particles having a particle diameter of 5 μm or more, and the number of particles having a particle diameter of 3 μm or more are calculated as the amounts of coarse particles (ppm) relative to the total number of particles measured.

Quantitative determination of the content of coarse particles can be made by a particle size distribution measurement by a laser diffraction scattering method or observation using SEM. However, in the observation using SEM, the number of particles that can be observed at a time in the same field of view is limited, and thus, it is inefficient to observe the coarse particles in the order of ppm for the quantitative determination. In the particle size distribution measurement by the laser diffraction scattering method, the amount of a silica-based composite oxide sample to be measured is limited to avoid multiple scattering, and the detection is performed at percentage level as described in Japanese Unexamined Patent Publication No. 2008-19157, i.e., the detection sensitivity is low. Thus, these methods are unsuitable for the quantitative determination of a trace amount of particles having a particle diameter of 5 μm or more in the silica-based composite oxide fine particles of the present invention, for example.

As will be specifically described in Examples, the coarse particles, even if not detected in the particle size distribution measurement by the laser diffraction scattering method, may be detected in the quantitative determination by the Coulter counter method. The present invention has found that the presence of such coarse particles causes the resin composition to decrease in fluidity or to be clogged in a gap when the resin composition is used for semiconductor encapsulation materials, or causes scratches and defects to reduce the yield when the powder is used for films.

In the silica-based composite oxide powder of the present invention, a coefficient of variation, which is one of indices indicating the spread of the particle size distribution, is 40% or less, preferably 30% or less, and particularly preferably 25% or less. When the coefficient of variation exceeds the above-described range, the particle size distribution becomes broad, and fine particles and coarse particles may possibly increase as compared to a powder having the same mean particle diameter. Here, the coefficient of variation is obtained from the particle size distribution measured by the laser diffraction scattering method.

The silica-based composite oxide powder of the present invention preferably has an α ray emission of 0.002 c/(cm²·h) or less. It has been known that when used as a filler in a resin composition for electronic materials, particles having large α ray emission cause a soft error such as reversal of charge accumulated in a memory cell. Due to finer geometries, higher integration, and improved 3D packaging technology in the field of semiconductor packages, the influence of the α ray from the filler is increasing, and thus, a filler with low α ray emission has been required.

Examples of impurities that emit the α ray include uranium (U) and thorium (Th). The U content and Th content in the silica-based composite oxide powder of the present invention are preferably 0.1 ppb or less, more preferably 0.05 ppb or less, and particularly preferably 0.02 ppb or less. The quantities of uranium and thorium are measured by ICP mass spectrometry, and the detection lower limit is 0.01 ppb.

The silica-based composite oxide powder of the present invention preferably has a Fe content of 10 ppm or less, an Al content of 10 ppm or less, a Na content of 5 ppm or less, a K content of 5 ppm or less, and a chloride ion content of 10 ppm or less. Further, it is preferable that a Ca content is 5 ppm or less, a Cr content is 5 ppm or less, and a Ni content is 5 ppm or less. In the silica-based composite oxide powder of the present invention, the amount of impurities that falls within the above-described ranges is advantageous because corrosion of metal wiring lines caused by the silica-based composite oxide particles used as a filler for a semiconductor encapsulation material can be reduced. The quantity of the chloride ions is measured by ion chromatography, and the quantities of other elements than the chloride ions are measured by ICP emission spectrometry.

The impurities include not only those derived from raw materials, but also those derived from wear debris of a reaction vessel, a pipe, and a cracking device. Note that Na, K, Ca, and chloride ions are often derived from an atmosphere.

The density and refractive index of the silica-based composite oxide particles of the present invention vary depending on the kinds and contents of metal oxides other than silica, or the temperature for calcining the particles, and thus, cannot be defined sweepingly. Most commonly, the particle density is in the range of 1.5 g/cm³ to 5 g/cm³, and the refractive index at 589 nm is in the range of 1.4 to 3. For example, when silica-titania composite oxide particles containing 30 mol % to 50 mol % titania were calcined at 1000° C., the particle density was in the range of 2.6 g/cm³ to 3.0 g/cm³, and the refractive index was in the range of 1.65 to 1.85.

In the present invention, the sphericity of the obtained silica-based composite oxide particles tends to decrease with the increase in content (molar fraction) of metal other than silica. The sphericity is generally 0.9 or more when the molar fraction of metal other than silica is 0.25 or less, and is generally 0.8 or more when the molar fraction is 0.25 or more. In either case, the particles are substantially independent spherical particles.

The silica-based composite oxide particles of the present invention are preferably less hygroscopic. The silica-based composite oxide particles are more apt to absorb moisture than pure silica particles. If the silica-based composite oxide particles are used as a filler for a resin, the absorbed moisture may generate bubbles when heated, which may cause a decrease in the yield. This is significant in the field of semiconductor encapsulation materials in which the filling ratio of the particles is high.

The absorption amount can be evaluated by the heating loss described below. Specifically, a particle powder is caused to absorb moisture under the conditions of 25° C. and a humidity of 80% for 24 hours, and then heated at 300° C. for five hours. A difference in mass before and after the heating is divided by the mass after the heating, and the obtained value is evaluated in terms of %.

When the silica-based composite oxide particles of the present invention are produced by sol-gel method described later, the heating loss evaluated by the above method is 0.1% to 20%, but can be reduced by calcination. The higher the calcination temperature is, the more the heating loss tends to decrease. Further, when a surface treatment described below is performed to make the particles hydrophobic, the heating loss can be reduced. Both of the calcination and the surface treatment are preferably performed. Taking the applications described above into consideration, the heating loss is 5% or less, preferably 3% or less.

The particles forming the silica-based composite oxide powder of the present invention may be surface-treated with a silylating agent and/or a silane coupling agent. The surface treatment performed in this manner gives good fluidity to the resulting surface-treated silica-based composite oxide particles, and can reduce water absorbency (heating loss). From this viewpoint, the particles are preferably surface-treated with the silylating agent.

As the silylating agent or the silane coupling agent, a known silane coupling agent generally used for the surface treatment can be used without particular limitation, and may be suitably selected and used based on the performance required for the surface-treated silica-based composite oxide particles.

Examples of the silane coupling agent include methyltrimethoxysilane, methyltriethoxysilane, hexyltrimethoxysilane, decyltrimethoxysilane, phenyltriethoxysilane, vinyltrimethoxysilane, vinyltriethoxysilane, 3-(methacryloyloxy) propyltrimethoxysilane, 3-(methacryloyloxy) propyltriethoxysilane, 3-(acryloyloxy)trimethoxysilane, 3-(glycidoxypropyl)trimethoxysilane, 3-(glycidoxypropyl) triethoxysilane, 3-(aminopropyl)trimethoxysilane, 3-(aminopropyl)triethoxysilane, N-(2-aminoethyl)-3-aminopropyltrimethoxysilane, N-(2-aminoethyl)-3-aminopropylmethyldimethoxysilane, N-phenyl-3-aminopropyltrimethoxysilane, N,N-dimethyl-3-aminopropyltrimethoxysilane, N,N-diethyl-3-aminopropyltrimethoxysilane, and 4-styryltrimethoxylsilane.

Examples of the silylating agent include tetramethyldisilazane, hexamethyldisilazane, and heptamethyldisilazane.

The surface treatment may be performed using two or more different silylating agents and/or silane coupling agents.

The silica-based composite oxide powder of the present invention, if modified by the surface treatment with the silylating agent and/or the silane coupling agent described above, preferably has hydrophobicity (M value) measured by the methanol titration method of 5 to 70. The M value is generally 0 if the powder is unmodified.

The surface-modified powder preferably has a carbon content of 0.01 mass %·g/m$^2$ to 0.06 mass %·g/m$^2$ per unit surface area. The carbon content per unit surface area is a value obtained by dividing the carbon content per mass by the area per mass (specific surface area).

The silica-based composite oxide powder of the present invention preferably has a specific surface area of 1 m$^2$/g to 25 m$^2$/g measured by a single-point method using nitrogen.

The silica-based composite oxide powder of the present invention contains no coarse particles, and exhibits good fluidity when introduced into a resin, and thus, can be advantageously used as a filler of a resin composition for electronic materials. Further, the silica-based composite oxide powder of the present invention allows the resin composition to flow smoothly when melts, can control the transparency of a molded product, and can control surface irregularities with precision. Therefore, the silica-based composite oxide powder of the present invention can be advantageously used for various molded products, such as films.

The type of the resin in which the silica-based composite oxide powder of the present invention is blended is not particularly limited. The type of the resin may be suitably selected depending on the desired application, and examples thereof include an epoxy resin, an acrylic resin, a silicone resin, a polyester resin, and an olefin-based resin.

For example, the epoxy resin, the acrylic resin, and the silicone resin are preferably used for semiconductor encapsulation materials. The olefin-based resin (e.g., polypropylene, polyethylene, and polystyrene), and the polyester resin are preferably used for films.

The amount of silica-based composite oxide powder blended into the resin composition may be appropriately adjusted according to the use and purpose thereof. Specifically, the powder content is preferably in a range of 30 parts by mass to 900 parts by mass relative to 100 parts by mass of the resin when the resin composition is used for semiconductor encapsulation materials, and in a range of 0.01 parts by mass to 10 parts by mass relative to 100 parts by mass of the resin when the resin composition is used for films. The resin composition may additionally contain a filler different from the silica-based composite oxide powder of the present invention.

Further, the silica-based composite oxide powder of the present invention can control the charge amount, and thus, can be advantageously used as a filler for toners.

<<Method for Producing Silica-Based Composite Oxide Powder>>

The silica-based composite oxide powder of the present invention may be produced by any production method, but is suitably produced by sol-gel method described below.

The sol-gel method refers to a process in which metal alkoxide is hydrolyzed and polycondensed in a reaction medium including catalyst-containing water and an organic solvent to form a sol, and the sol is gelated to form oxide particles.

Specifically, the sol-gel method includes the following steps (1) to (7):

(1) preparing a partial hydrolysate of silicon alkoxide (hereinafter, this step may be hereinafter referred to as "partial hydrolysis");

(2) mixing the partial hydrolysate with alkoxide of metal selected from the group consisting of titanium and zirconium or a mixture of the alkoxide of the metal and a complexing agent such that titanium or zirconium is mixed in a proportion of 50 mol % or less to a total amount of metal, thereby preparing a composite alkoxide material (this step may be hereinafter referred to as "compounding");

(3) hydrolyzing and condensing the composite alkoxide material in a dispersion medium containing water to obtain composite oxide particles (this step may be hereinafter referred to as "condensation");

(4) wet-filtering the dispersion using a filter medium having a pore size of 5 µm or less (this step may be hereinafter referred to as "filtration");

(5) adding a compound including at least one selected from the group consisting of carbon dioxide, ammonium carbonate, ammonium bicarbonate, and ammonium carbamate to the wet-filtered dispersion of the composite oxide particles to coagulate the composite oxide particles, thereby obtaining a coagulated composite oxide dispersion containing the coagulated composite oxide (this step may be hereinafter referred to as "coagulation");

(6) separating the composite oxide particles from the coagulated composite oxide dispersion (this step may be hereinafter referred to as "solid-liquid separation"); and (7) drying the separated composite oxide particles (this step may be hereinafter referred to as "drying").

In order to obtain the silica-based composite oxide powder of the present invention, it is preferable to perform the following additional steps:

(8) calcining the composite oxide particles at 600° C. to 1200° C. (this step may be hereinafter referred to as "calcination"); and (9) cracking the calcined composite oxide particles (this step may be hereinafter referred to as "cracking").

These steps will be described in detail below.

(1) Partial Hydrolysis

In this step, a partial hydrolysate of silicon alkoxide is prepared. The partial hydrolysate is readily obtained by hydrolyzing silicon alkoxide with water by the method described below.

In the partial hydrolysate of silicon alkoxide, at least one of alkoxy groups of silicon alkoxide is hydrolyzed to form a silanol group (Si—OH). In the production method of the present invention, the number of hydrolyzed alkoxy groups is not necessarily the same. For example, the partial hydrolysate may be prepared as a mixture containing different chemical species, such as a chemical species having only a single hydrolyzed alkoxy group and a chemical species having two or more hydrolyzed alkoxy groups. When a mixture having a mean value of the number of hydrolyzed alkoxy groups can be said to be a partial hydrolysate, the mixture may contain a chemical species having an alkoxy group(s) that is not hydrolyzed at all, and a chemical species having an alkoxy group(s) all of which is hydrolyzed. The mixture may further contain a chemical species having a Si—O—Si bond formed through partial condensation after hydrolysis.

The partial hydrolysate of the silicon alkoxide is preferably prepared as a solution of a hydrophilic organic solvent. Typical examples of the organic solvent include alcohols such as methanol, ethanol, propyl alcohol, and isopropyl alcohol.

The partial hydrolysate of the silicon alkoxide may contain a small amount of acid or base.

As silicon alkoxide to be hydrolyzed with water to obtain the partial hydrolysate, any compound that is used for the production of silica particles by a sol-gel reaction can be used without any particular limitation.

Specific examples of the silicon alkoxide (alkoxysilane) include methyltrimethoxysilane, methyltriethoxysilane, tetramethoxysilane, tetraethoxysilane, tetraisopropoxysilane, and tetrabutoxysilane. Among them, methyltrimethoxysilane, tetramethoxysilane, and tetraethoxysilane are more preferable because they are easily industrially available and easy to handle. These silicon alkoxides may be used alone or in combination of two or more.

Further, in order to obtain a silica-based composite oxide powder with low impurity content, the silicon alkoxide with high purity is preferably used. To obtain the silicon alkoxide with high purity, a raw material can be purified by distillation in advance.

If the silicon alkoxide is liquid at room temperature and normal pressure, it may be used as it is, or may be diluted with an organic solvent described later for use. If the silicon alkoxide is qsolid at normal temperature and normal pressure, it can be dissolved or dispersed in an organic solvent for use.

A procedure for bringing the silicon alkoxide described above and water into contact with each other to obtain the partial hydrolysate has been known in the art, and the conditions, typical examples of which will be described below, may be suitably set according to various constraints.

The water used may be ion exchange water, distilled water, or pure water. In general, 0.2 or more and less than one molecule of water per an alkoxy group to be hydrolyzed is brought into contact with the silicon alkoxide.

In order to bring them into contact, it is preferable to use an organic solvent that is compatible with both of the silicon alkoxide and water, such as alcohol. If an organic solvent such as alcohol is not used, phase separation between the silicon alkoxide and water tends to occur, and the partial hydrolysis may not proceed, or the reaction may proceed very slowly.

Typical examples of the organic solvent include alcohols such as methanol, ethanol, propyl alcohol, and isopropyl alcohol. The amount of the organic solvent used is not particularly limited as long as the above-mentioned object is achieved, and may be generally controlled such that the amount of the silicon alkoxide reaches 50 mass % to 95 mass %.

In a general procedure, a solution of silicon alkoxide in an organic solvent is prepared, to which a predetermined amount of water is added.

In order to cause the partial hydrolysis to proceed rapidly, a catalyst is preferably used. The catalyst is preferably mixed with water used for the hydrolysis so that the catalyst is used as an aqueous solution. Acid is suitably used as the catalyst, and specific examples thereof include hydrochloric acid, sulfuric acid, nitric acid, and oxalic acid, but there is no particular limitation. The amount of the acid used is preferably controlled such that the pH of the aqueous solution falls within the range of 1 to 4. Unlike a basic catalyst, the acid catalyst does not easily cause the condensation of the hydrolysate, thereby allowing blocking of the formation of particles.

The present inventors' idea about the mechanism of partial hydrolysis will be described below. It will be described below the case in which tetramethyl silicate is used as the silicon alkoxide. Through the partial hydrolysis, methoxide of tetramethyl silicate is partially hydrolyzed, and a silanol group (SiOH) is formed in the molecule (see the chemical formula (1) below). It is considered that the hydrolysis reaction of methoxide proceeds sequentially, and methoxy hydroxysilane (a partial hydrolysate of silicon alkoxide) is generated as a main product according to the amount of water used as indicated by the following formula. However, the actual reactant is considered to be a mixture having a composition distribution (a mixture of compounds having different degrees of hydrolysis).

(Chemical Formula 1)

$$Si(OMe)_4 + nH_2O \rightarrow Si(OMe)_{4-n}(OH)_n + nMeOH \qquad (1)$$

(In the formula (1), "Me" represents a methyl group (the same applies hereinafter), and "n" is an integer of 1 to 4.) In the production method of the present invention, in order to obtain composite oxide particles having a uniform composition, the amount of water used for the partial hydrolysis of the silicon alkoxide is preferably controlled. As can be seen from the formula (1), the amount of water used for the partial hydrolysis reaction of the silicon alkoxide is a factor that determines the number of silanol groups introduced into a silane compound to be produced, and the number of silanol groups included in a single molecule of a partial hydrolysate of silicon alkoxide affects the uniformity of a composite alkoxide material to be prepared in the following compounding.

That is, in the compounding, when a partial hydrolysate of silicon alkoxide having a silanol group is mixed with alkoxide of titanium and/or zirconium (these will be collectively referred to as "specific dissimilar metal"), a reaction (dealcoholation reaction) occurs between the silanol group and the alkoxy group of the alkoxide of specific dissimilar metal to form a Si—O-M bond (where M represents a specific dissimilar metal atom). As a result, a composite alkoxide material as represented by Sia·Mb·(OR)c·(OH)d (where a, b, c, and d respectively represent the number of Si atoms, M atoms, OR groups, and OH groups contained in a single molecule).

From the viewpoint of producing composite oxide fine particles having uniform composition, it is preferable to prepare a composite alkoxide material having a composition corresponding to the composition of the intended composite oxide fine particles without forming a gel in the compounding. For this purpose, it is important to control the number of silanols included in a single molecule of the partial hydrolysate of silicon alkoxide, and the amount of silanol groups contained in the entire product of the partial hydrolysis reaction. In order to control the amount of silanol groups, the amount of water used may be controlled. The water used may be ion exchange water, distilled water, or pure water. In general, the amount of water is controlled such that 0.2 or more and less than one molecule of water is contained per an alkoxy group to be hydrolyzed.

Specifically, when the amount of silanol groups is small as compared to the amount of the alkoxide of the specific dissimilar metal, the alkoxide of the specific dissimilar metal may be left unreacted. Conversely, when the amount of the silanol groups is too large, the silanol groups, or the silanol group and the alkoxy group bonded to Si, react with each other to form the Si—O—Si bond, resulting in gelation and formation of particles.

The presence of the partial hydrolysate of silicon alkoxide obtained from the materials that are brought into contact with each other in this manner can be easily checked by a known method.

(2) Compounding

In the compounding, the partial hydrolysate of silicon alkoxide described above is mixed with alkoxide of other metal than silicon (specific dissimilar metal) selected from the group consisting of titanium and zirconium or a mixture of the alkoxide of the specific dissimilar metal and a complexing agent such that the specific dissimilar metal is mixed in a proportion of less than 50 mol % to the total amount of metal to prepare a composite alkoxide material.

The hydrolysis of the alkoxide of specific dissimilar metal proceeds much faster than the hydrolysis of silicon alkoxide. Thus, if the alkoxide of the specific dissimilar metal and the silicon alkoxide are merely mixed to obtain composite oxide particles by the sol-gel method, nucleation or grain growth of oxide of the specific dissimilar metal preferentially occurs.

For this reason, it is difficult to control the composition and particle diameter of the particles. In particular, the difference in the hydrolysis rate has a great influence on an initial stage of nucleation and particle growth. Thus, it is extremely difficult to obtain silica-based composite oxide particles, which are composite oxide particles of silicon and the specific dissimilar metal having uniform composition and reduced amount of aggregates and coarse particles, by the method described below. Therefore, in the production method of the present invention, silicon alkoxide and alkoxide of specific dissimilar metal are combined in advance to prepare a precursor, and the precursor is used as a material in a normal sol-gel method, so that silica-based composite oxide powder which is homogeneous and contains only a trace amount of coarse particles and aggregates can be obtained.

<Alkoxide of Specific Dissimilar Metal>

As the alkoxide of specific dissimilar metal used in the production method of the present invention, any compound can be used without particular limitation as long as it is alkoxide of metal selected from the group consisting of titanium and zirconium, and is hydrolyzed and polycondensed in the presence of water.

Examples of the alkoxide of specific dissimilar metal include titanium alkoxide ($Ti(OR)_4$) and zirconium alkoxide ($Zr(OR)_4$). R is an alkyl group, and is preferably a lower alkyl group such as a methyl group, an ethyl group, an isopropyl group, or a butyl group.

For example, metal alkoxide such as titanium tetraisopropoxide, titanium tetra-n-butoxide, zirconium n-butoxide, and zirconium t-butoxide may be used.

Among the above-described alkoxides of specific dissimilar metal, titanium tetraisopropoxide, titanium tetra-n-butoxide, and zirconium n-butoxide are preferable, and titanium tetraisopropoxide and zirconium n-butoxide are particularly preferable because they are industrially easily available and easy to handle.

In the production method of the present invention, the alkoxides of specific dissimilar metal may be used alone, or in combination of two or more.

Further, in order to obtain the silica-based composite oxide powder with low impurity content, the alkoxide of specific dissimilar metal with high purity is preferably used. A raw material can be purified by distillation in advance to obtain the alkoxide of specific dissimilar metal with high purity.

When the alkoxide of specific dissimilar metal is liquid at room temperature and normal pressure, it may be used as it is in the mixing, which will be described later, or may be diluted with an organic solvent described later before the mixing. When the alkoxide of specific dissimilar metal is solid at normal temperature and normal pressure, it can be dissolved or dispersed in an organic solvent for use.

In the mixing, a partial hydrolysate obtained by hydrolysis of at least one alkoxide group of the alkoxide of specific dissimilar metal with an acidic or basic catalyst and water may also be used.

If an oxide of specific dissimilar metal is contained in a relatively low proportion, e.g., less than 20 mol %, the partial hydrolysate of silicon alkoxide and the alkoxide of the specific dissimilar metal are simply mixed together to prepare a composite alkoxide material (will be hereinafter referred to as a "regular composite alkoxide material" to be distinguished from a composite alkoxide material to be complexed as will be described later). Just using this material can sufficiently reduce the nucleation and grain growth of the oxide of specific dissimilar metal (can provide a moderating effect).

However, when the oxide of specific dissimilar metal is contained in a relatively high proportion, e.g., 20 mol % or more, the moderating effect cannot be provided sufficiently in the "compounding by mixing of the partial hydrolysate of silicon alkoxide and the alkoxide of the specific dissimilar metal."

Therefore, in the present invention, if the proportion of the specific dissimilar metal is 20 mol % or more, the following method is employed. Specifically, a mixture of the alkoxide of specific dissimilar metal and a complexing agent is mixed with the partial hydrolysate of silicon alkoxide to obtain a composite alkoxide material (will be hereinafter referred to as a "complex composite alkoxide material" to be distinguished from the regular composite alkoxide material described above). When the alkoxide of specific dissimilar metal is mixed with the complexing agent, a complex is produced. In this state, the hydrolysis rate of the alkoxide of specific dissimilar metal decreases to approach the hydrolysis rate of silicon alkoxide. Therefore, even when the specific dissimilar metal is contained at a high proportion, composite oxide fine particles having uniform composition can be obtained.

Although it has been described that the threshold of the content proportion of the specific dissimilar metal is 20 mol %, it does not mean that the reactivity of the regular composite alkoxide material abruptly changes at the threshold of 20 mol %. For example, even when the regular composite alkoxide material contains more than 20 mol % of the specific dissimilar metal, expected silica-based composite oxide particles can be obtained under suitably selected conditions. Further, use of the complex composite alkoxide material is not limited to the case in which the content proportion of the specific dissimilar metal exceeds 20 mol %. Even if the content proportion is 20 mol % or less (e.g., when the content of the specific dissimilar metal is 0.1 mol % to 20 mol %), the expected silica-based composite oxide particles can be obtained without any problems.

Next, the method of preparing the regular composite alkoxide material and the method of preparing the complex composite alkoxide material will be described in detail below.

(Method of Preparing Regular Composite Alkoxide Material)

The regular composite alkoxide material can be prepared by mixing alkoxide of metal other than silicon selected from the group consisting of titanium and zirconium, and a partial hydrolysate of silicon alkoxide.

Examples of the alkoxide of specific dissimilar metal are those described above.

In the preparation of the regular composite alkoxide material, the mixing ratio of the partial hydrolysate of silicon alkoxide and the alkoxide of specific dissimilar metal is determined based on the intended ratio between silica and oxide of the specific dissimilar metal in the finally obtained silica-based composite oxide fine particles. Specifically, based on the amount by mole (gram atomic mass) of Si atoms contained in the partial hydrolysate of silicon alkoxide used, the amount by mole (gram atomic mass) of the specific dissimilar metal (M) required for the composition of the composite oxide fine particles to be obtained (i.e., the intended mole % of the specific dissimilar metal) is determined, and the alkoxide of specific dissimilar metal may be used in an amount corresponding to the determined number of moles.

For example, in order to produce silica-based composite oxide fine particles containing 80 mol % of silica and 20 mol % of titania, the partial hydrolysate and titanium alkoxide are mixed to satisfy {Ti/(Si+Ti)}×100=20, where Si is the amount of silicon by mole in the partial hydrolysate, and Ti is the amount of titanium by mole in titanium alkoxide.

The regular composite alkoxide material can be suitably prepared by mixing a reaction liquid that has subjected to the partial hydrolysis of silicon alkoxide and a predetermined amount of alkoxide of specific dissimilar metal under stirring. The mixing may be performed at a time, or may be performed continuously or intermittently over time. The liquid temperature during the mixing is suitably maintained at 5° C. to 50° C. The stirring time of about ten minutes to two hours is sufficient, although it varies depending on the reaction temperature.

For example, when a reaction liquid obtained by a partial hydrolysis reaction represented by the following formula (4) is mixed with tetraisopropyl titanate (tetraisopropoxytitanium), which is alkoxide of specific dissimilar metal, a compounding reaction represented by the following formula (5) is considered to occur.

(Chemical Formula 2)

(4)

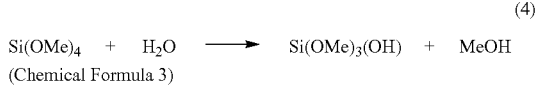

(Chemical Formula 3)

(5)

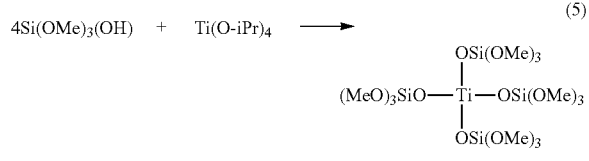

(Method of Preparing Complex Composite Alkoxide Material)

The complex composite alkoxide material can be prepared by mixing the alkoxide of specific dissimilar metal and a complexing agent, and then mixing the obtained mixture with the partial hydrolysate of silicon alkoxide. This preparation method is the same as the preparation method of the regular composite alkoxide material except that the mixing of the alkoxide of specific dissimilar metal and the complexing agent is additionally performed. The mixing is considered to produce a complex of the specific dissimilar metal. For the sake of convenience, the complex produced by the mixing is also referred to as a "mixture."

The complexing agent is not particularly limited as long as it produces a complex with titanium or zirconium. Examples thereof include (1) alkylene glycols (ethylene glycol, propylene glycol, diethylene glycol, triethylene glycol, polyethylene glycol, polypropylene glycol, and glycerol), (2) glycol alkyl ethers (ethylene glycol monoethyl ether, ethylene glycol monobutyl ether, diethylene glycol monomethyl ether, diethylene glycol monoethyl ether, tetraethylene glycol monomethyl ether, and propylene glycol monoethyl ether), (3) glycol allyl ethers (ethylene glycol monophenyl ether), (4) β-dicarbonyl compounds (acetylacetone), (5) amines (ethylenediamine, diethanolamine, and triethanolamine), (6) hydroxyacetone, (7) acetals (acetone dimethyl acetal), and (8) carboxylic acids (acetic acid, lactic acid, and citric acid). Among them, amines such as triethanolamine, β-dicarbonyl compounds, hydroxyacetone, and carboxylic acids are preferable.

The alkoxide of specific dissimilar metal and the complexing agent can be mixed in a polar solvent, preferably alcohol. The same alcohol used for the partial hydrolysis of silicon alkoxide may be used. The amount of the polar solvent used is not particularly limited, but is generally controlled such that the concentration of the alkoxide of specific dissimilar metal reaches 50 mass % to 99 mass %.

The obtained mixture is suitably retained for a while to produce the complex before mixing with silicon alkoxide.

The retaining temperature may be in the range of 5° C. to a boiling point of the solvent. The complexing reaction sufficiently proceeds even at room temperature. In order to sufficiently obtain the moderating effect, the mixing with the complexing agent is preferably followed by retaining for ten minutes to two hours in general, depending on the temperature. The specific dissimilar metal is presumed to be complexed sufficiently during the retaining period.

In the mixing, the mole ratio between the alkoxide of specific dissimilar metal and the complexing agent is important from the viewpoint of controlling the rate of hydrolysis of the alkoxide of specific dissimilar metal. In order to obtain composite oxide fine particles having uniform composition, the rate of hydrolysis of the complex to be produced is preferably adjusted to be the same as the rate of hydrolysis of silicon alkoxide. Changing the mole ratio between the alkoxide of specific dissimilar metal and the complexing agent can control the hydrolysis rate of the complex. Thus, a suitable ratio can be appropriately determined from the above viewpoint depending on the combination of the alkoxide of specific dissimilar metal and the complexing agent. The mole ratio can be easily determined by a simple experiment. The suitable mole ratio of the complexing agent/the alkoxide of specific dissimilar metal varies depending on the kind, number, and structure of coordinating atoms of the complexing agent used, but is preferably 0.3 to 0.8 in general.

An example of the experiment for determining the ratio will be described below. In this example, tetraisopropyl titanate (may be referred to as tetraisopropoxytitanium, and may be hereinafter abbreviated as "TPT") was used as the alkoxide of specific dissimilar metal, and triethanolamine (may be hereinafter abbreviated as "TEA") was used as the complexing agent.

This experiment was performed in the following manner to check the relationship between the ratio of TPT and TEA and the hydrolysis rate of the obtained complex. First, 25 g of 0.3% ammonia water was poured in a glass beaker having an inner volume of 100 mL. A stirring bar having a diameter of 8 mm and a length of 30 mm was placed in the glass beaker, which was set in a stirrer (Magnetic Stirrer HS-4DN manufactured by AS ONE Corporation). Stirring was performed at a room temperature and the number of revolutions of 200 rpm, and 25 g of a "50 mass % solution of TPT and TEA mixed in each of various ratios in methanol" prepared separately was added at a time, and the hydrolysis rate was evaluated by measuring gelation time immediately after the addition of the methanol solution until the solution was gelled. The solution was determined to be gelled at a time point when the viscosity of the solution increased to stop the movement of the stirring bar. Table 1 shows the results.

In another experiment conducted under the same conditions except that tetramethylsilicate was used as the silicon alkoxide instead of TPT and TEA, the gelation time was 14 minutes.

TABLE 1

| | Mixing Ratio of TEA/TPT | | | | | | |
|---|---|---|---|---|---|---|---|
| | 0.1 | 0.4 | 0.45 | 0.5 | 1.0 | 1.5 | 2.0 |
| Gelation Time | 0 min | 3 min | 5 min | 20 min | 2 days or more | 2 days or more | 2 days or more |

The results indicate that when the ratio TEA/TPT was 0.5, the gelation time was the closest to the gelation time (14 minutes) when tetramethyl silicate was used. Therefore, in Examples to be described later, the ratio TEA/TPT=0.5. However, the idea of the present invention is to equalize the hydrolysis rate of the alkoxide of specific dissimilar metal to the hydrolysis rate of silicon alkoxide. Therefore, the mixing ratio of TEA and TPT is not limited to the above value as long as the idea is achieved, but the hydrolysis rate of the alkoxide of specific dissimilar metal is suitably within the gelation time (sec) of silicon alkoxide±70%.

The present inventors assume that the following complex is formed when TEA and TPT are mixed in the ratio TEA/TPT=0.5.

(Chemical Formula 4)

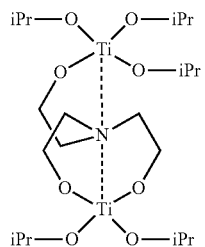

(6)

In the formula (6), "iPr" represents an isopropyl group (the same applies hereinafter).

When the complex prepared in this manner and a partial hydrolysate of silicon alkoxide are mixed, the complex composite alkoxide material is prepared. In this case, the mixing of the complex and the partial hydrolysate of silicon alkoxide can be performed in the same manner as the mixing of the partial hydrolysate of silicon alkoxide and the alkoxide of specific dissimilar metal for the preparation of the regular composite alkoxide material.

(3) Condensation

In this step, the composite alkoxide material is hydrolyzed and condensed in a dispersion medium containing water to obtain composite oxide particles.

<Dispersion Medium>

In the production method of the present invention, a polar solvent is preferably used as the dispersion medium used for the hydrolysis and polycondensation reaction of the metal alkoxide. The polar solvent refers to a solvent that dissolves 10 g or more of water per 100 g at room temperature and normal pressure. If a plurality of solvents are mixed for use, the obtained mixture may satisfy the above-described requirement.

The dispersion medium essentially contains water for the hydrolysis of alkoxide. Since alkoxide is usually oleophilic, an organic solvent that can be mixed with water is preferably used in combination so that the alkoxide can be uniformly dissolved and the reaction can proceed rapidly and stably. Such a solvent mixture can be used as the polar solvent. These components will be described below.

<Water>

Water is essential to the reaction by the sol-gel method (and thus, the polar solvent that dissolves water is used). When the basic catalyst is added as an aqueous solution and when water is used as part or all of the solvent, the reaction liquid does not require additional water. However, in the other cases, water required for the sol-gel reaction needs to be added.

The proportion of water used is suitably adjusted and selected in accordance with the particle diameter of the silica-based composite oxide particles to be produced. If the proportion of water used is too small, the reaction rate decreases. Conversely, if the proportion is too large, drying (removal of the solvent) takes a long time. Therefore, the proportion of water used is selected in consideration of both requirements. The proportion of water used is preferably in the range of 2 mass % to 50 mass %, more preferably 5 mass % to 40 mass %, relative to the total mass of the silica-based composite oxide dispersion obtained by the sol-gel reaction.

The water may be used as part or all of the reaction solvent, or may be added to the reaction liquid after reaction materials other than water are prepared. The water used as the solvent also includes water which is added in association with the addition of a basic catalyst.

<Organic Solvent>

As described above, alkoxide serving as the raw material usually does not dissolve in water. Therefore, to make the reaction field uniform, an organic solvent that can be mixed with water is preferably used in combination.

Examples of the organic solvent include: alcohols such as methanol, ethanol, and isopropyl alcohol; ethers such as tetrahydrofuran and dioxane; and amide compounds such as dimethylformamide, dimethylacetamide, and N-methylpyrrolidone.

Alcohol is a by-product of the sol-gel reaction. Thus, among those listed above, alcohols such as methanol, ethanol, isopropyl alcohol, and butanol are particularly preferably used because they can keep unwanted impurities from entering the silica particle dispersion after the reaction, and can be easily removed by heating.

The organic solvent and water may be used alone, or may be used as a mixture of two or more solvents.

The proportion of the organic solvent or water used may be appropriately determined according to the intended particle diameter of the silica-based composite oxide particles and the desired concentration of the silica-based composite oxide particles in the silica-based composite oxide particle dispersion after the sol-gel reaction. For example, if alcohol is used as the organic solvent, the proportion of alcohol to the mass (100 mass %) of the silica-based composite oxide particle dispersion obtained by the sol-gel reaction is preferably 10 mass % to 90 mass %, more preferably 15 mass % to 80 mass %.

<Basic Catalyst>

In the production of the silica-based composite oxide particles by the sol-gel method, a suitable hydrolysis catalyst is usually used. In the present invention, an acidic catalyst may be used, but a basic catalyst is preferably used in this step because spherical particles having a uniform particle diameter are easily obtained.

As the basic catalyst used in the present invention, any known basic catalyst used for producing silica particles by the sol-gel reaction can be suitably used.

Examples of the basic catalyst include amine compounds and alkali metal hydroxides. In particular, the amine compound is suitably used from the viewpoint that the amount of impurities containing metal other than the metal elements which are components of the intended silica particles is small, and high purity silica particles are obtained. Examples of the amine compound include ammonia, methylamine, dimethylamine, trimethylamine, ethylamine, dimethylamine, and trimethylamine. Among them, ammonia is particularly preferably used because it is highly volatile and easy to remove, and allows the sol-gel reaction to proceed rapidly.

The basic catalyst may be used alone, or in combination of two or more.

The basic catalyst may be used as it is as the one industrially available (in a commercially available form), or may be diluted in water or an organic solvent, for example, in the form of ammonia water. In particular, from the viewpoint of easily controlling the reaction rate, the basic catalyst is preferably diluted in water and used as an aqueous solution having a concentration adjusted as needed. If the basic catalyst is used as an aqueous solution, its concentration is preferably in the range of 1 mass % to 30 mass % because it is industrially easily available and the concentration adjustment is easy.

The ratio of the basic catalyst used may be suitably determined in consideration of the rates of hydrolysis and polycondensation reactions of metal alkoxide. The proportion of the basic catalyst used is preferably set such that the reaction solution has pH 8 or more. The amount of basic catalyst in the reaction solution is preferably 0.1 mass % to 60 mass %, more preferably 0.5 mass % to 40 mass %, relative to the mass of silicon alkoxide used.

<Reaction Apparatus>

In the production method of the present invention, any reaction apparatus is used without particular limitation as long as the reaction apparatus is a reactor having a stirrer. As an impeller of the stirrer, any known impeller may be used without particular limitation. Typical examples of the impeller include an inclined paddle impeller, a turbine impeller, a three-blade retreat impeller, an anchor impeller, a FULL-ZONE impeller, a TWINSTIR impeller, and a MAXBLEND impeller.

In addition, as a reactor having such a stirrer, a reactor of a general shape, such as a hemispherical reactor or a cylindrical reactor having a flat or round bottom, and a reactor having a baffle installed therein can be used without particular limitation. Further, the material of the reactor is not particularly limited, and a glass reactor, a reactor made of metal such as stainless steel (including the one coated with glass or resin), or a resin reactor may be used. In order to obtain the sol-gel silica-based composite oxide powder in which the above-described impurities are reduced, the reactor material preferably has good wear resistance.

The stirring efficiency of the reactor used in the production method of the present invention is not particularly limited. However, the reactor desirably has a dimensionless mixing time $n\theta m$, which is an index of the stirring efficiency of the reactor, of 100 or less (where n is the number of revolutions of the stirring impeller (1/s), and $\theta m$ is mixing time (s)). Setting the dimensionless mixing time $n\theta m$ within the above range can keep the reaction liquid uniform during the reaction, which makes it possible to obtain sol-gel silica-based composite oxide powder having a more uniform particle diameter and narrow particle size distribution.

In general, most of reactors that handle a reaction liquid of 50 L or more in the industrial practice described later have the stirring efficiency within the above-described range.

The dimensionless mixing time $n\theta m$ is the product of the number of revolutions of the stirring impeller n (1/s) and the mixing time $\theta m$ (s), and is a very useful index of the stirring efficiency because it is uniquely determined regardless of the scale of the reactor as long as the stirring Reynolds number is constant. In general, $\theta m$ refers to time taken until a tracer material is uniformly mixed. The mixing time $\theta m$ is influenced by the shape of the reactor, the presence or absence of the baffle, how the baffle is arranged, the type and number of revolutions of the stirring impeller, and viscoelasticity of the liquid to be mixed.

If the dimensionless mixing time $n\theta m$ is less than 55, the reactor has high stirring efficiency, and can sufficiently stir the reaction liquid without easily causing the adhesion or aggregation of the particles. If the value $n\theta m$ is 55 to 100, the adhesion or aggregation of the particles can be reduced by supplying a metal alkoxide solution to the reaction liquid at a throughput linear velocity of 30 mm/s to 1500 mm/s. On the other hand, if the dimensionless mixing time $n\theta m$ exceeds 100, the reactor has extremely low stirring efficiency, and cannot cause sufficient mixing, This makes the reaction liquid ununiform and causes many particles to be easily adhered or aggregated.

<Reaction Conditions>

The hydrolysis and polycondensation (the sol-gel reaction) in the production method of the present invention are usually carried out in the presence of a basic catalyst as described above. Any well-known conditions may be adopted as the reaction conditions, and how the regular or complex composite alkoxide material is brought into contact with the basic catalyst is not particularly limited. Suitable selection may be made to obtain a silica powder having a desired particle size distribution in consideration of the configuration of the reaction apparatus and the scale of the reaction.

A specific example of the sol-gel reaction is as follows.

For example, in an exemplary method, water, a polar solvent (organic solvent) other than water, and a basic catalyst are charged in a reaction vessel, to which the regular or complex composite alkoxide material (or a solution of the regular or complex composite alkoxide material in an organic solvent), and an aqueous basic catalyst solution are simultaneously added.

This method is preferable because the reaction efficiency is good and spherical silica particles having a uniform particle diameter can be efficiently produced with good reproducibility. In this case, for example, part of the regular or complex composite alkoxide material may be added first, and then the remaining regular or complex composite alkoxide material and the basic catalyst may be simultaneously added. When two or more kinds of regular or complex composite alkoxide materials are used in combination, the materials may be mixed to simultaneously add, or may be added in a sequential manner.

The regular or complex composite alkoxide material and the basic catalyst may be preferably added dropwise in the reaction liquid. The dropwise addition in the liquid means that the material is dropped into the reaction liquid with the tip of a drip opening immersed in the reaction liquid. Further, it is desirable that the tip of the drip opening is positioned, for example, near the stirring impeller, where the stirring is sufficiently performed and the drip can be quickly dispersed into the reaction liquid.

Addition time (time from the start to end of the addition) of the regular or complex composite alkoxide material and the basic catalyst is a very important factor for producing particles having a narrow particle size distribution width. If the addition time is too short, the particle size distribution width tends to increase, and conversely, if the addition time is too long, the particles cannot grow stably. Therefore, in order to obtain sol-gel silica-based composite oxide particles having a narrow particle size distribution width and a uniform particle diameter, the addition time suitable for the growth of particles needs to be selected. In particular, in order to produce sol-gel silica-based composite oxide particles having good monodispersity, the material such as the regular or complex composite alkoxide material is preferably supplied at a throughput linear velocity of 30 mm/s to 1000 mm/s. From this viewpoint, the addition time is preferably in the range of 0.2 hours to 8 hours per 100 nm of the desired particle diameter.

The reaction temperature is not particularly limited as long as it is a temperature at which the sol-gel reaction rapidly proceeds depending on the type of the material used, and may be suitably selected depending on the intended particle diameter of the silica-based composite oxide particles. In order to obtain silica-based composite oxide particles having a mean particle diameter of 0.05 μm to 2 μm, the reaction temperature may be suitably selected in the range of −10° C. to 60° C.

In order to cause the sol-gel reaction to reliably proceed, aging may be performed (taking a pause for a while until the next step is performed) after the end of the dropwise addition of the regular or complex composite alkoxide material and the basic catalyst. In this case, the aging is preferably performed at the same temperature as the reaction temperature, i.e., −10° C. to 60° C., and aging time is preferably 0.25 hours to 5 hours.

In order to obtain silica-based composite oxide particles having a desired particle diameter, different methods may be used. For example, the regular or complex composite alkoxide material and the basic catalyst may be added again after the aging to further increase the particle diameter of the silica-based composite oxide particles.

<Dispersion of Silica-Based Composite Oxide Particles>

The above-described method makes it possible to obtain a dispersion of silica-based composite oxide particles produced by the sol-gel method and having a mean particle diameter of 0.05 μm to 2.0 μm measured by the laser diffraction scattering method. In this dispersion, the silica-based composite oxide particles are dispersed in a dispersion medium including a polar solvent used with water and alcohol produced by hydrolysis of the regular or complex composite alkoxide material.

In the above-described dispersion, the silica-based composite oxide particles are favorably monodispersed without causing substantial adhesion or aggregation. However, some coarse independent primary particles having a particle diameter of more than 5 μm (will be hereinafter referred to as "coarse independent primary particles") are present due to reaction advanced locally and excessively. Specifically, the silica-based composite oxide particles contain about 15 ppm to 1000 ppm of the coarse independent primary particles. If these particles remain in the finally obtained silica-based composite oxide powder as described above, problems arise, such as a decrease in fluidity of the resin composition.

If the ratio of the silica-based composite oxide particles contained in the silica-based composite oxide dispersion is too large, the dispersion becomes more viscous, making the dispersion difficult to handle. On the other hand, if the proportion of the silica-based composite oxide particles in the dispersion is too small, the amount of silica particles obtained by a single reaction becomes small, which is uneconomical. From such viewpoints, the concentration of the silica-based composite oxide particles in the obtained dispersion of the silica-based composite oxide particles is preferably 1 mass % to 40 mass %, particularly preferably 2 mass % to 35 mass %. Therefore, the amount of polar solvent used, especially the amount of polar solvent other than water used, is preferably adjusted so that the concentration of the silica-based composite oxide particles falls within the above range. If the proportion of the silica-based composite oxide particles in the dispersion obtained by the sol-gel reaction is too large, thereby causing difficulty in handing of the dispersion, the polar solvent is preferably added to adjust the concentration before filtration of the dispersion to be described next, or before a surface treatment performed as needed.

Metal oxide other than silica, such as titania and zirconia, contained in the silica-based composite oxide may sometimes give the silica-based composite oxide acidity and reactivity with a surface treatment agent that are different from those of silica. In this case, a small amount of silicon alkoxide such as tetramethoxysilane or tetraethoxysilane may be added after the completion of the growth reaction of the particles to coat the surface with silica.

In the synthesis of particles by the sol-gel reaction, the coefficient of variation is preferably smaller because the possibility of the production of the coarse particles is lowered. In order to reduce the coefficient of variation, the dimensionless mixing time $n\theta m$, which is the index of the stirring efficiency, may be set to fall within the above-described range.

(4) Filtration

In the method of the present invention, the dispersion of the silica-based composite oxide particles obtained after the sol-gel reaction is wet-filtered using a sieve having a pore size of 5 μm or less to remove the coarse independent primary particles contained therein. Specifically, when the silica-based composite oxide dispersion is filtered, the coarse independent primary particles, and the particles adhered or aggregated, if any, are separated on a filter medium together with reaction residues.

Alkoxide of metal other than silicon has higher reactivity than silicon alkoxide, and thus, the aggregation is more likely to occur than the case in which silica is synthesized using silicon alkoxide alone. Therefore, the filtration is very important for producing the silica-based composite oxide powder of the present invention.

As the filter medium, a wet filtration filter having a pore size of 5 µm or less can be used without particular limitation, and a wet filtration filter having a pore size of 3 µm or less can be suitably used. When the pore size is too small, filterability is lowered, and the mean particle diameter of the silica-based composite oxide particles to be filtered greatly deviates from the above range. Therefore, the lower limit of the pore size is usually 1 µm, although it varies depending on the intended mean particle diameter of the powder.

The material for the filter is not particularly limited, and examples thereof include a resin (polypropylene and PTFE) and metal. From the viewpoint of avoiding the entry of metal impurities, a resin filter is preferably used.

The filtration may be performed twice or more. If the filtration is performed twice or more, filters having different pore sizes may be used.

<Surface Treatment (R1)>

In producing the silica-based composite oxide powder of the present invention, at least one surface treatment agent selected from the group consisting of silicone oil, a silane coupling agent, and silazane may be added to the dispersion to perform a surface treatment before coagulation to be described later.

The surface treatment enables efficient solid-liquid separation to be described later. In addition, the surface treatment can keep the particles from aggregating firmly when dried. Thus, the obtained silica-based composite oxide particles can be used in various applications without performing any special cracking process. However, when the particles are calcined as described later, the surface treatment agent is generally burned off. Thus, depending on the purpose of use, the surface treatment needs to be performed again after the calcination.

The surface treatment may be performed for the dispersion after the sol-gel reaction before the coagulation, and may be performed either before or after the filtration of the dispersion. However, the surface treatment is preferably carried out before the filtration of the dispersion because the coarse independent primary particles are reduced with high accuracy. This can remove the aggregates produced during the surface treatment and residues of the surface treatment agent in the filtration of the dispersion.

As the silicone oil, known silicone oil used for the surface treatment of inorganic oxide particles such as silica particles may be used without particular limitation, and the silicone oil may be suitably selected and used according to the performance required for the surface-treated silica-based composite oxide particles.

Specific examples of the silicone oil include dimethylsilicone oil, methylphenylsilicone oil, methylhydrogensilicone oil, alkyl-modified silicone oil, amino-modified silicone oil, epoxy-modified silicone oil, carboxyl-modified silicone oil, carbinol-modified silicone oil, methacryl-modified silicone oil, polyether-modified silicone oil, and fluorine-modified silicone oil.

The proportion of the silicone oil used is not particularly limited. However, a sufficient surface treatment cannot be performed if the proportion is too small, and a post-treatment becomes complicated if the proportion is too large. Therefore, the proportion is preferably 0.05 parts by mass to 80 parts by mass, more preferably 0.1 parts by mass to 60 parts by mass, relative to 100 parts by mass of the silica-based composite oxide particles used.

The silane coupling agent used in this step is the same as that described in the section of the silica-based composite oxide powder of the present invention, but in this step, the silane coupling agent is burned off in the calcination to be described later. Therefore, if the calcination is carried out, there is no need to use an expensive silane coupling agent having a reactive functional group, and various types of alkylsilanes may suffice.

The proportion of the silane coupling agent used is not particularly limited. However, the surface treatment cannot be sufficiently performed if the proportion is too small, and a post-treatment becomes complicated if the proportion is too large. Therefore, the proportion is preferably 0.05 parts by mass to 80 parts by mass, more preferably 0.1 parts by mass to 40 parts by mass, relative to 100 parts by mass of the silica-based composite oxide particles used.

As the silazane, the silylating agent described in the section of the silica-based composite oxide powder of the present invention can be used.

Specific examples of the silazane include tetramethyldisilazane, hexamethyldisilazane, and heptamethyldisilazane. Among them, hexamethyldisilazane is suitably used from the viewpoint of good reactivity and good handleability.

The proportion of silazane used is not particularly limited. However, the surface treatment cannot be sufficiently performed if the proportion is too small, and a post-treatment becomes complicated if the proportion is too large. Therefore, the proportion is preferably 0.1 parts by mass to 150 parts by mass, more preferably 1 part by mass to 120 parts by mass, relative to 100 parts by mass of the silica-based composite oxide particles used.

The above-described surface treatment agents may be used alone or in combination of two or more.

Among the surface treatment agents described above, at least one selected from the group consisting of the silane coupling agent and silazane is preferably used, and silazane is more preferably used, in view of good fluidity of the obtained surface-treated silica-based composite oxide particles.

The surface treatment agent may be added by any method without particular limitation. If the surface treatment agent is low viscosity liquid at room temperature and normal pressure, it may be added dropwise to the dispersion. If the surface treatment agent is high viscosity liquid or solid, it can be added to a suitable organic solvent to form a solution or a dispersion, which is then added to the dispersion in the same manner as the addition of the low viscosity liquid. The organic solvent used herein may be the same as the above-described polar solvent. Further, if the surface treatment agent is gaseous, it can be blown into the liquid to form fine bubbles in the liquid.

The temperature for the surface treatment may be determined in consideration of the reactivity or any other characteristics of the surface treatment agent used. However, the reaction is slowed if the treatment temperature is too low, and the operation is complicated if the treatment temperature is too high. Thus, the treatment temperature is preferably 10° C. or higher and equal to or less than the boiling point of the dispersion medium, more preferably 20° C. to 80° C.

Time for the surface treatment is not particularly limited, and may be determined in consideration of the reactivity or any other characteristics of the surface treatment agent used. Taking sufficient progress of the surface treatment reaction and shortening of process time into consideration, the treatment time is preferably 0.1 hours to 48 hours, more preferably 0.5 hours to 24 hours.

(5) Coagulation

In this step, coagulation is performed after the filtration of the dispersion.

The coagulation is performed in a state in which a coagulant including at least one compound selected from the group consisting of carbon dioxide, ammonium carbonate, ammonium bicarbonate, and ammonium carbamate is added to the dispersion. When the coagulant as described above is added to the dispersion, weak aggregates of the silica-based composite oxide particles are formed in the dispersion. The aggregates can be stably present in the dispersion in the presence of the coagulant or a derivative thereof in the dispersion, and thus, can be easily recovered by filtration.

A technique for forming the aggregates of silica-based composite oxide particles by adding a metal salt to a dispersion of the silica-based composite oxide particles has been known. In this technique, for example, when a salt such as a sodium salt or a potassium salt is used, a metal element component of the salt may be mixed into the resulting silica-based composite oxide particles. This is industrially disadvantageous because cleaning (purification) for removing the metal component is required. Moreover, the particles may be aggregated firmly, and cannot be cracked into the primary particles by a simple cracking process, and the aggregates may remain as coarse particles in the resulting silica-based composite oxide powder.

On the other hand, the coagulant used in the present invention is easily decomposed and removed when slightly heated, and thus, has an advantage of easy production of high purity silica-based composite oxide particles. According to the method of the present invention, the proportion of a sodium element, for example, in the resulting silica-based composite oxide particles can be controlled to be 100 ppm or less, generally 10 ppm or less.

The proportion and addition method of the coagulant may be determined as follows depending on the type of the coagulant used. The proportion of the coagulant used is determined in consideration of the balance between the formation of the weak aggregates of the silica-based composite oxide particles in the dispersion and the waste of a large amount of material unreasonably used. The mass of the silica-based composite oxide particles as a reference of the proportion of the coagulant used is a conversion value on the assumption that silicon alkoxide used is entirely hydrolyzed and polycondensed to form the silica-based composite oxide particles.

If carbon dioxide is used as the coagulant, the proportion of carbon dioxide used is preferably 0.005 parts by mass or more, more preferably 0.005 parts by mass to 300 parts by mass, relative to 100 parts by mass of the silica-based composite oxide particles contained in the dispersion. If no surface treatment is performed on the silica-based composite oxide particles, the proportion of carbon dioxide used is preferably 0.05 parts by mass or more, more preferably 0.05 parts by mass to 300 parts by mass, particularly preferably 0.25 parts by mass to 200 parts by mass, relative to 100 parts by mass of the silica-based composite oxide particles. If the surface treatment is performed on the silica-based composite oxide particles, the proportion of carbon dioxide used is preferably 15 parts by mass or more, more preferably 15 parts by mass to 300 parts by mass, particularly preferably 17 parts by mass to 200 parts by mass, relative to 100 parts by mass of the silica-based composite oxide particles.

Carbon dioxide may be added to the dispersion in a gaseous state to be blown into the dispersion, or in a solid state (dry ice). Adding carbon dioxide in the solid state is preferable because it is easily carried out.

If ammonium carbonate, ammonium bicarbonate, or ammonium carbamate is used as the coagulant, the proportion thereof is preferably 0.001 parts by mass or more, more preferably 0.001 parts by mass to 80 parts by mass, relative to 100 parts by mass of the silica-based composite oxide particles contained in the dispersion. If no surface treatment is performed on the silica-based composite oxide particles, the proportion of ammonium carbonate, ammonium bicarbonate, or ammonium carbamate used is preferably 0.001 parts by mass to 80 parts by mass, particularly preferably 0.001 parts by mass to 50 parts by mass, relative to 100 parts by mass of the silica-based composite oxide particles. If the surface treatment is performed on the silica-based composite oxide particles, the proportion of ammonium carbonate, ammonium bicarbonate, or ammonium carbamate used is preferably 15 parts by mass or more, more preferably 15 parts by mass to 80 parts by mass, particularly preferably 17 parts by mass to 60 parts by mass, still more preferably 20 parts by mass to 50 parts by mass, relative to 100 parts by mass of the silica-based composite oxide particles.

Ammonium carbonate, ammonium bicarbonate, or ammonium carbamate may be added in a solid state, or in a state of a solution prepared by dissolving the coagulant in a suitable solvent. The solvent used to add the coagulant in a state of a solution is not particularly limited as long as it can dissolve the coagulant, but is preferably water because it has high dissolution ability and is easy to remove after the filtration. The concentration of the solution of ammonium carbonate, ammonium bicarbonate, or ammonium carbamate is not particularly limited as long as they are dissolved. However, if the concentration is too low, the amount of the solution used increases uneconomically. Thus, the concentration is preferably 2 mass % to 15 mass %, more preferably 5 mass % to 12 mass %.

The coagulants described above may be used alone, or in combination of two or more.

In particular, a mixture of ammonium bicarbonate and ammonium carbamate, which is commercially available and generally called "ammonium carbonate," can be used as it is, or as a solution prepared by dissolving the mixture into a suitable solvent. In this case, the total proportion of ammonium bicarbonate and ammonium carbamate used, the type of the solvent used to add them in the form of a solution, and the concentration of the solution are the same as those described above in the case in which ammonium carbonate, ammonium bicarbonate, or ammonium carbamate is used alone.

As the coagulant in the present invention, at least one selected from the group consisting of ammonium bicarbonate and ammonium carbamate is preferably used. Among them, ammonium hydrogencarbonate is more preferably used, and an aqueous ammonium hydrogencarbonate solution is particularly preferably used.

The pH of the silica-based composite oxide particle dispersion to which the coagulant is added is selected to fall within a pH region in which the effect of the present invention can be effectively exhibited without causing unwanted decomposition of the coagulant in the dispersion. From such a viewpoint, the pH of the dispersion preferably is in an alkaline region, more preferably 9 or more. If the basic catalyst is used in the condensation described above, the pH of the resulting dispersion often falls within this pH range even if no pH adjuster is used.

The temperature of the silica-based composite oxide particle dispersion to which the coagulant is added is desirably selected to be a temperature at which the weak aggregates of silica-based composite oxide particles produced by the addition of the coagulant can stably exist. From such a viewpoint, the temperature of the dispersion is preferably the same as the temperature during the sol-gel reaction, i.e., from −10° C. to 60° C., more preferably from 10° C. to 55° C.

After the addition of the coagulant, the aging is preferably performed, i.e., taking a pause for a while before the next step of solid-liquid separation. The aging performed after the addition of the coagulant preferably promotes the formation of the weak aggregates of the silica-based composite oxide particles. Longer aging time is more effective, but too long aging time is uneconomical.

On the other hand, too short aging time makes the formation of the weak agglomerates of the silica-based composite oxide particles insufficient. Therefore, the aging time is preferably 0.5 hours to 72 hours, particularly preferably an hour to 48 hours. The temperature of the dispersion during the aging is not particularly limited. The aging may be performed at a temperature within the same temperature range as the temperature preferable for the addition of the coagulant, and may be sufficiently performed at the same temperature at which the coagulant is added.

(6) Solid-Liquid Separation

In the method of the present invention, the solid-liquid separation is the step of recovering the silica-based composite oxide particles by solid-liquid separation from the dispersion which has subjected to the addition of the coagulant, and preferably the aging, as described above. The solid-liquid separation may be performed by any known method without particular limitation, and is most preferably performed by filtration. Other examples of the method include centrifugation, sedimentation and decantation, and removal of solvents by volatilization.

Specifically, the silica-based composite oxide particles that have formed weak aggregates by the addition of the coagulant can be easily recovered as filter residues by filtration. The filtration method is not particularly limited, and for example, a known method such as vacuum filtration, pressure filtration, or centrifugal filtration can be used.

Filter paper, filters, and filter cloths used in the filtration (will be hereinafter collectively referred to as "filter paper") may be used without particular limitation as long as they are industrially available, and may be suitably selected according to the scale of a separation device (filtration device). According to the present invention, the addition of the coagulant causes the primary particles to be weakly aggregated. Thus, the filter paper may have a pore size that is much larger than the diameter of the primary particles. For example, when the silica-based composite oxide particles have a mean particle diameter of 0.01 μm to 5 μm, the pore size of about 5 μm may be sufficient. Since the filter paper may have a large pore size, the filtration can be performed quickly.

Through the filtration, the silica-based composite oxide particles are recovered as a cake.

The cake obtained in the coagulation is rinsed with a suitable solvent such as water or alcohol to decompose or remove the solvent used in the sol-gel reaction, the basic catalyst, and an unreacted surface treatment agent.

(7) Drying

In this step, the silica-based composite oxide particles recovered by the filtration described above are dried.

When dried at a temperature of 35° C. or higher, the cake of the silica-based composite oxide particles recovered as described above is cracked more easily. Therefore, the temperature for the drying of the present invention is preferably set to 35° C. or higher. When heated at this temperature, the coagulant that has not been removed by the filtration and the rinsing, and that is remaining in the cake can be thermally decomposed to be easily removed. This is also one of the major advantages of the present invention.

The method of drying is not particularly limited, and any known method such as air drying or vacuum drying can be employed.

The higher drying temperature is more advantageous from the viewpoint of efficiency of the decomposition of the coagulant. However, if a surface treatment agent having a reactive substituent is used to perform the surface treatment described above, the reactive substituent may produce aggregates if the drying temperature is too high. In consideration of these factors, the drying temperature is preferably 35° C. to 200° C., more preferably 50° C. to 200° C., particularly preferably 70° C. to 130° C.

The drying time is not particularly limited, but drying for about 2 hours to 48 hours can sufficiently dry the silica-based composite oxide particles.

In the present invention, the solid-liquid separation and the drying may be performed by a method of volatilizing the dispersion medium by heating and decompression. According to this method, the dispersion medium is volatilized off from the silica-based composite oxide particle dispersion. Thus, the silica-based composite oxide particles concentrated and dried can be directly obtained from the dispersion. At this time, a salt derived from a specific coagulant may be lost when the dispersion medium is removed by heating. In this case, the specific coagulant may be suitably added to the concentrate of the silica-based composite oxide dispersion in the course of concentration and drying, so that the salt in the concentrate is not lost.

In the present invention, the silica-based composite oxide particles obtained by the above-described method are in the form of dry powder in which the particles are weakly aggregated together. The silica-based composite oxide particles do not produce aggregates that are difficult to crack, and thus, can be easily cracked and have good dispersibility. The silica-based composite oxide particles can be easily cracked by the shear of a disperser for dispersing the particles into a resin or a solvent, and can be uniformly dispersed in the resin or the solvent, without performing any special cracking process. Also in the measurement of the amount of foreign matters by the Coulter counter method described above, 5 mass % of the silica-based composite oxide powder is added to water or ethanol, and an ultrasonic wave is applied to the resulting solution at an output of about 40 W for about 10 minutes so that the particles are easily cracked and dispersed in the solution.

Through the above-described steps, the silica-based composite oxide particles of the present invention can be obtained. However, the silica-based composite oxide particles that are just dried still have the silanol groups or any other residues, and pores. Further, a small amount of the dispersion medium may still remain in some cases. In order to sufficiently remove the dispersion medium in the particles and remove the silanol groups to obtain solid silica-based composite oxide, the resulting powder is preferably calcined in accordance with the application.

Specifically, the calcined silica-based composite oxide particles are preferable because the remaining dispersion medium is removed from the particles, the obtained particles are homogeneous with reduced pores, and the amount of silanol groups is reduced. If the particles are used as a filler for a resin, the solvent, if remains in the particles, generates bubbles when the resin is heated, which causes defective products. Further, when the particles having the pores are used as a filler for a transparent resin, haze occurs in the resin. Moreover, the silanol group facilitates adsorption of moisture. Therefore, the calcination is performed to remove the dispersion medium remaining in the particles for solidification, and to reduce the absorption amount of moisture (heating loss).

(8) Calcination

If the calcination temperature is too low, the dispersion medium component cannot be easily removed. If the calcination temperature is too high, the silica-based composite oxide particles are fused and/or titania is crystallized. Therefore, the calcination temperature is preferably 300° C. to 1200° C., more preferably 600° C. to 1050° C., particularly preferably 850° C. to 1050° C. The calcination performed at the higher temperature is more apt to reduce the amount of silanol groups and the amount of heating loss. However, it is practically impossible to completely reduce the amount of silanol groups to zero only by the calcination.

The silica-based composite oxide particles are more apt to cause fusion of the particles during the calcination than pure silica particles. In particular, if the silica-based composite oxide particles are calcined at a high temperature of 1000° C. or higher, the coarse particles that have been reduced in the step of "(4) Filtration" described above are more apt to increase due to the fusion.

More specifically, as shown in FIG. 1, the higher the calcination temperature is, the more the amount of coarse particles of 5 μm or more tends to increase. FIG. 1 shows an example of the result of 10-hour calcination of silica-titania composite oxide having a mean particle diameter of 0.4 μm and a Ti content of 7 mol %. Metals other than Ti, such as Zr, also exhibit the same tendency, and show substantially the same correspondence function between the amount of coarse particles and the calcination temperature as that shown in FIG. 1.

Therefore, in order to obtain the silica-based composite oxide of the present invention, it is highly necessary to (1) set the calcination temperature to be lower than 1000° C., preferably 950° C. or lower, particularly preferably 920° C. or lower, or to (2) disperse the calcined composite oxide in a solvent again to perform wet filtration. The wet filtration after the calcination may be carried out in the same manner as the filtration performed after the surface treatment which will be described later.

The calcination time is not particularly limited as long as the remaining dispersion medium is removed, the pores are reduced to a desired degree, or the amount of silanol groups is sufficiently reduced. However, when the calcination time is too long, the productivity decreases. Thus, once the temperature is raised to the intended calcination temperature, the calcination may be performed at this temperature for 0.5 hours to 48 hours, more preferably 2 hours to 24 hours. The calcination performed in this manner makes it possible to reduce the amount of heating loss to 3 mass % or less, and reduce the amount of isolated silanol groups to 1.0 or less.

The calcination may be performed in any atmosphere without particular limitation, and may be performed under an inert gas such as argon or nitrogen, or in the atmosphere.

The silica-based composite oxide particles obtained after the calcination are also in the form of dry powder in which the particles are weakly aggregated together as described above. The measurement of the particle size distribution under the above-described conditions allows determination of whether the resulting powder is the silica-based composite oxide powder of the present invention. If there are many aggregated particles as a result of the calcination at a high temperature of 1000° C. or higher, the wet filtration can be performed as described above to reduce the aggregated particles, thereby obtaining the silica-based composite oxide powder of the present invention.

In the present invention, the silica-based composite oxide powder obtained by the drying is mostly amorphous. Although the powder remains amorphous when the calcination temperature is low, but metal oxide other than silica may become partially crystalline if the calcination temperature is high.

(9) Cracking

In the present invention, the silica-based composite oxide powder obtained by the above steps can be used for various applications without performing any special cracking process, but can be cracked by a known cracking means to further reduce the aggregates according to the purpose of use. The cracking can reduce the amount of foreign matters having a particle diameter of 3 μm or more to 5 ppm or less. Further, if a surface treatment (R2) which will be described later is performed, the cracking has the effect of improving the efficiency of the surface treatment.

Examples of the known cracking means include a ball mill and a jet mill.

If the powder is dispersed in a resin or a solvent using a high-shear force disperser, the particles can be cracked in parallel with the dispersing into the resin or the solvent without using any known cracking means.

<Surface Treatment (R2)>

The silica-based composite oxide powder of the present invention may be surface-modified through a surface treatment of the calcined silica-based composite oxide particles using at least one surface treatment agent selected from the group consisting of silicone oil, a silane coupling agent, and silazane.

The surface treatment improves affinity (compatibility) with a resin used as a film material. This can keep the particles from falling off when formed into the film, and can provide improved strength and reduced viscosity when formed into a resin composition such as an adhesive. Further, the amount of isolated silanol groups can be reduced. When combined with the effect provided by the calcination, the surface treatment can reduce the amount of isolated silanol groups to 0.1 or less, or to 0.0. Moreover, water absorbency is lowered, which can reduce the heating loss to 1% or less.

The types and amounts of the silicone oil, the silane coupling agent, and silazane are the same as those described in the section of the silica-based composite oxide powder of the present invention or the section of "Surface Treatment (R1)" of the production method.

These surface treatment agents may be used alone or in combination of two or more.

Among the surface treatment agents described above, at least one selected from the group consisting of the silane coupling agent and silazane is preferably used, and silazane is more preferably used, in view of good fluidity of the obtained surface-treated silica-based composite oxide particles.

The surface treatment (R2) can be performed by a known method such as a wet method or a dry method, but the dry method is preferably employed because the particles are not easily aggregated after the treatment.

<Surface Treatment Apparatus and Method for Surface Treatment (R2)>

In the present invention, the size of a mixer for mixing the silica-based composite oxide powder and various surface treatment agents is not particularly limited, but in general, a mixer having an inner volume of 10 L to 4 m³ is suitably used. In the present invention, the mixer includes a mixing means, and the mixing means includes a mixing means installed in the mixer. It is not preferable that the mixing means is a rotating body having a driver.

In the present invention, any known mixing means can be used without any particular limitation except for the above limitation. Examples thereof include a V-blender, a rocking mixer, and a double-cone mixer that rotate or swing a container to mix the contents, and an air blender that mixes the contents by the air.

On the other hand, the rotating body having a driver and being installed in the mixer, which is an inappropriate example of the mixing means of the present invention, may be a stirring/mixing impeller. If a mixer provided with the impeller, e.g., a Henschel mixer or a Loedige mixer, is used, the sol-gel silica-based composite oxide receives a stirring energy as large as 50 J or more from the stirring/mixing impeller that collides with the oxide, which causes the particles to be easily aggregated.

The mixer used in the present invention preferably includes at least one cracking blade as a means for equalizing the particle diameters of the silica-based composite oxide powder before and after the treatment. The cracking blade is a rotating body having a rotary shaft and serving as a cracking means, and is at least one blade having the shaft that passes its center of gravity or having the shaft positioned at one end thereof, and extending in a direction perpendicular to the shaft. A plurality of cracking blades may be disposed coaxially at any position on the rotary shaft as long as each blade is sufficiently spaced from an inner wall of a mixing container, and from other blades. Two or more blades may be disposed at the same position or different positions. In consideration of an inner volume of the mixer, the amount of the sol-gel silica-based composite oxide powder to be handled, and a cracking energy described below, one to four blades are preferably disposed on a single rotary shaft.

In the present invention, the cracking energy of the cracking blade is 0.3 J to 10 J. If the cracking energy is less than 0.1 J, the aggregated particles cannot be sufficiently cracked, and remain aggregated. If the cracking energy exceeds 20 J, the sol-gel silica-based composite oxide disadvantageously tends to be aggregated again. Here, the cracking energy is remarkably smaller than the stirring energy of 50 J or more of the stirring/mixing impeller used as the mixing means described above. Thus, the cracking blade of the present invention is clearly distinguished from a rotating body having a driver as the mixing means, i.e., the stirring/mixing impeller.

An example of a method for calculating the cracking energy will be described in detail below. The cracking energy is calculated for each rotary shaft. First, the moment of inertia of the cracking blade is obtained.

(Case in which Blade has Shaft Passing its Center of Gravity)

Suppose that the cracking blade has a long side of a length a1 (m) in the direction perpendicular to the rotary shaft, a short side of a length b (m), a thickness t (m), and a weight M (kg), and the number of coaxially disposed blades is m, a moment of inertia ($Iz_1$) of the blade having the shaft passing its center of gravity is calculated by the following equation (1).

$$Iz_1 (kg \cdot m^2) = (a_1^2 + b^2) \times M/12 \times m \quad \text{(Equation 1)}$$

(Case in which Blade has Shaft Positioned at One End Thereof)

Suppose that the cracking blade has a long side of a length a2 (m) in the direction perpendicular to the rotary shaft, a short side of a length b (m), a thickness t (m), and a weight M (kg), and the number of coaxially disposed blades is m, a moment of inertia ($Iz_2$) of the blade having the shaft at one end thereof is calculated by the following equation (2).

$$Iz_2 (kg \cdot m^2) = (a_2^2 + b_2 + 12(a_2/2)^2) \times M/12 \times n \quad \text{(Equation 2)}$$

(Case in which Blade Having Shaft passing its Center of Gravity Coexists with Blade Having Shaft Positioned at One End Thereof)

The moment of inertia ($Iz_3$) of the cracking blade is calculated by the following Equation (3).

$$Iz_3 (kg \cdot m^2) = Iz_1 + Iz_2 \quad \text{(Equation 3)}$$

Next, the cracking energy E (J) is calculated from the following equation (4) by using the moments of inertia calculated from the equations (1), (2), and (3) and the number of revolutions ω (rad/s) of the cracking blade.

$$\text{Cracking energy } E(J) = Iz \times \omega^2 / 2 \quad \text{(Equation 4)}$$

In the case in which the cracking blade has a shape other than the above-described shape, the cracking energy can be obtained by a known mathematical equation according to the shape of the cracking blade.

It is sufficient for the mixer of the present invention that the cracking energy per a rotary shaft falls within the above range, and at least one rotary shaft having the cracking blade is provided. Alternatively, two or more rotary shafts may be provided, and in such a case, the cracking energy of the cracking blade of each of the rotary shafts may fall within the range of 0.3 J to 10 J.

The rotary shaft and the cracking blade may be made of any material without particular limitation. Examples of the material include metals such as stainless steel and aluminum, resins such as polycarbonate, polypropylene, and acryl. Among them, metal, particularly stainless steel, is preferable because of its high wear resistance.

The shape of the cracking blade is not particularly limited, and a known cracking blade may be used. For example, a horizontal, L-shaped, or columnar cracking blade may be used.

The size of the cracking blade is not particularly limited as long as the cracking blade is placed in the device and the cracking energy falls within the above range. The cracking blade may be arranged to be sufficiently spaced from a wall surface of the device or the other cracking blades so as not to collide with the wall surface or the other cracking blades even when a load is applied thereto by the contents during the rotation.

If the long side of the cracking blade is too short, the cracking effect is reduced (the higher number of revolutions is required to obtain a necessary cracking energy). However, if the long side is too long, a larger amount of power is required for the rotation. Further, the longer the long side of the crushing blade is, the larger the cracking energy becomes to exceed the above range, and the sol-gel silica-based composite oxide is easily aggregated again. Therefore, the length of the long side of the cracking blade is preferably 300 mm or less.

The length of the short side of the cracking blade is not particularly limited, but is generally about 0.05 to 0.2 times as large as the length of the long side. The thickness of the cracking blade is not particularly limited, but is preferably 1 mm to 5 mm.

The number of revolutions of the cracking blade is also directly related to the cracking energy as expressed by the above equation. Depending on the size of the cracking blade, the number of revolutions is preferably 50 to 300 (rad/s). If the number of revolutions is too low, the cracking effect is reduced, and conversely, if the number of revolutions exceeds 310 (rad/s), the cracking energy tends to exceed 10 J. If the number of revolutions is set to be a small value, a mechanical load tends to be reduced.

Therefore, the lengths of the long and short sides, the thickness, the number of the cracking blades, and the number of revolutions may be relatively selected within the above ranges in consideration of the material, i.e., the weight, of the cracking blades so that the cracking energy per a rotary shaft obtained from the above equations (1) to (4) is 0.3 J to 10 J.

The position of the rotary shaft of the cracking blade is not particularly limited as long as the cracking blade is located at a position to be in contact with the powder in the device. For example, if the V-blender, the rocking mixer, or the double-cone mixer is used, the cracking blade is able to make contact with the powder irrespective of its position in the mixer. Thus, the cracking blade can be arranged at any position on an inner circumferential surface of a barrel and inner wall surfaces at both ends of the barrel. If the air blender is used, the cracking blade may be arranged to be able to efficiently make contact with the sol-gel silica-based composite oxide powder in consideration of the flow of the powder under the air flow. Thus, the cracking blade can be arranged at any position on an inner circumferential surface of a barrel and an inner wall surface on a ceiling.

Next, a surface treatment method (R2) will be described in detail below.

First, the silica-based composite oxide powder is supplied into the mixer, to which a surface treatment agent is supplied. The amount of the silica-based composite oxide powder to be supplied is not particularly limited as long as the mixing of the supplied silica-based composite oxide powder is allowed. In view of general treatment efficiency, the amount of the silica-based composite oxide powder is preferably 10% to 60%, more preferably 30% to 50%, relative to the inner volume of the mixer.

The surface treatment agent may be diluted with a solvent, and then mixed with the sol-gel silica-based composite oxide. The solvent used is not particularly limited as long as it dissolves the surface treatment agent. For example, alcohols such as methyl alcohol, ethyl alcohol, and 1-propyl alcohol are suitably used, but organic solvents other than alcohols may also be used. The dilution ratio is not particularly limited, but the surface treatment agent is generally diluted two-fold to five-fold with the solvent.

The surface treatment agent may be supplied at a time, or may be continuously or intermittently supplied while mixing. If the amount to be treated is large, or the amount of the surface treatment agent is large, the surface treatment agent is preferably supplied continuously or intermittently while mixing. The surface treatment agent is preferably dropped or sprayed using a pump or any other means. A known spray nozzle can be suitably used to spray the surface treatment agent.

The atmosphere in the mixer is not particularly limited, but an inert gas such as nitrogen, helium, or argon is preferably used. This can block hydrolysis caused by moisture and oxidative decomposition caused by oxygen.

When the surface treatment agent is continuously or intermittently supplied, the supply rate of the surface treatment agent is not particularly limited, but may be determined in consideration of the amount of the surface treatment agent to be supplied. In general, the surface treatment agent is preferably supplied at a rate of 1 ml/min to 20 ml/min per 100 g of the silica-based composite oxide powder. Particularly if the amount of the surface treatment agent to be supplied is large, a low supply rate makes the treatment time long and productivity poor. If the surface treatment agent is supplied at a time, or at a too high supply rate, the droplets of the surface treatment agent become large, and particles of the silica-based composite oxide powder are easily aggregated.

The temperature at which the surface treatment agent is supplied to and mixed with the silica-based composite oxide powder is not particularly limited. However, the temperature is generally about $-10°$ C. to $60°$ C. because the surface treatment agent is polymerized or abruptly vaporized when the temperature is too high.

The mixing may be performed as long as the surface treatment agent is uniformly mixed with the silica-based composite oxide powder, and time required for the mixing may be suitably determined depending on the amount of the silica-based composite oxide powder to be treated and the capacity of the mixer used. For example, if 80 kg of the silica-based composite oxide powder is treated with a double-cone mixer having an inner volume of 340 L, the mixture is sufficiently mixed in three hours.

Usually, when the silica-based composite oxide powder and the surface treatment agent are mixed, the aggregated particles are generated due to uneven distribution of the surface treatment agent and strong mixing energy. According to the method of the present invention, the rotating body having the driver is not used as the mixing means, which can reduce the generation of the aggregated particles in the silica-based composite oxide powder. Further, the aggregated particles, if generated, are efficiently cracked by the cracking blade installed in the mixer before they are firmly aggregated. Therefore, a mixture of the silica-based composite oxide powder and the surface treatment agent can be obtained with the aggregated particles extremely reduced.

Then, the mixture of the silica-based composite oxide powder and the surface treatment agent with reduced aggregated particles is heated to coat the surface of the silica-based composite oxide particles with the surface treatment agent. If the mixer has a heater, the heating can be performed in parallel with the mixing. Alternatively, the silica-based composite oxide powder sufficiently mixed with the surface treatment agent can be taken out, and then heated by another heater to perform the heating in the absence of the mixing means.

In the latter case, the atmosphere gas in the heater is not particularly limited, but is preferably an inert gas atmosphere such as nitrogen, helium, or argon just like in the mixer described above.

If the heating temperature is too low, the reaction proceeds slowly, and the production efficiency decreases. If the temperature is too high, the decomposition of the surface treatment agent is accelerated. Therefore, depending on the surface treatment agent to be used, it is generally preferable to perform the heating at $40°$ C. to $300°$ C., preferably at $80°$ C. to $250°$ C. More preferably, the surface treatment agent in the mixer preferably has a vapor pressure of 1 kPa or more in this temperature range, and much more preferably, the heating is performed at a temperature at which the vapor pressure of the surface treatment agent reaches 10 kPa or more. In the surface treatment of the silica-based composite oxide powder, the pressure in the mixer may be a normal pressure, a positive pressure, or a negative pressure.

<Wet Filtration of Surface-Treated Silica-Based Composite Oxide>

In the surface-treated silica-based composite oxide powder, adhered particles and aggregated particles (hereinafter will be collectively referred to as "coarse particles") are generated through the surface treatment, and the powder generally includes far more than 10 ppm of the coarse particles having a particle diameter of 5 µm or more. Therefore, in order to obtain the silica-based composite oxide powder of the present invention, these coarse particles need to be removed by wet filtration. Specifically, the surface-treated silica-based composite oxide is dispersed in a solvent, and the dispersion is wet-filtered to remove the coarse particles. As a result, the coarse particles are separated on the filter medium together with residues of the surface treatment reaction, and the silica-based dispersion from which the coarse particles are removed is recovered as a filtrate.

First, the surface-treated silica-based composite oxide powder is mixed with a solvent to prepare a dispersion.

As the solvent, a known solvent that does not affect the modifying group on the surface of the surface-treated silica-based composite oxide may be used. Specific examples of such a solvent include water and alcohols. If the surface-treated silica-based composite oxide is hydrophobic, the alcohols can be suitably used.

If the proportion of the surface-treated silica-based composite oxide particles contained in the surface-treated silica-based composite oxide particle dispersion is too large, the dispersion becomes more viscous, making the dispersion difficult to handle. On the other hand, if the proportion of the silica-based composite oxide particles in the dispersion is too small, the amount of surface-treated silica-based composite oxide particles obtained by a single reaction becomes small, which is uneconomical. From such viewpoints, the silica particle concentration in the obtained surface-treated silica-based composite oxide particle dispersion is preferably 1 mass % to 60 mass %, and particularly preferably 25 mass % to 50 mass %. If the proportion of the surface-treated silica-based composite oxide particles in the dispersion is too large and the dispersion is difficult to handle, the solvent is preferably added to adjust the concentration before the subsequent filtration of the dispersion.

As the filter medium, a wet filtration filter having a pore size of 5 µm or less can be used without particular limitation, and a wet filtration filter having a pore size of 3 µm or less is preferable. The filter medium may be selected in consideration of the intended mean particle diameter of the surface-treated silica-based composite oxide. However, if the pore size is small, the filterability is significantly lowered, and thus, the lower limit of the pore size is preferably 1 µm in general.

The material for the filter is not particularly limited, and examples thereof include a resin (polypropylene and PTFE) and metal. From the viewpoint of avoiding the entry of metal impurities, a resin filter is preferably used.

As described above, in order to obtain the silica-based composite oxide powder of the present invention, the filtration needs to be performed after the calcination if the calcination is performed at a high temperature and a large amount of particles are fused. However, if the wet filtration follows the surface treatment, only the wet filtration after the surface treatment will suffice. Specifically, even if a large amount of particles are fused into the coarse particles by the calcination at a high temperature, the coarse particles can be sufficiently removed by performing the wet filtration after the surface treatment without performing the filtration after the calcination.

<Solid-Liquid Separation of Surface-Treated Silica-Based Composite Oxide>

Subsequently, the surface-treated silica-based composite oxide particles are separated and recovered from the filtrate from which the coarse particles have been removed. The surface-treated silica-based composite oxide may be separated from the filtrate by any means without particular limitation, but can be easily recovered as filter residues by filtration. The filtration method is not particularly limited, and for example, a known method such as vacuum filtration, pressure filtration, or centrifugal filtration can be applied.

Filter paper and filter cloths used in the filtration (will be hereinafter collectively referred to as "filter paper") may be used without particular limitation as long as they are industrially available, and may be suitably selected according to the scale of a separation device (filtration device) and the mean particle diameter of silica to be recovered. If the surface-treated silica-based composite oxide particles have a particle diameter of 0.05 µm to 2 µm, filter paper having a retaining particle diameter of 3 µm or less, or a filter cloth having a permeability of 0.6 $cm^3/(cm^2 \cdot s)$ or less is preferably used. Through the solid-liquid separation, the surface-treated silica-based composite oxide is recovered as a cake.

<Drying of Surface-Treated Silica-Based Composite Oxide>

Next, the recovered surface-treated silica-based composite oxide is dried.

In the present invention, the cake of the silica-based composite oxide particles recovered as described above is more easily cracked when it is dried at a temperature of 35° C. or higher. Therefore, the temperature for the drying according to the present invention is preferably set to 35° C. or higher.

The method of drying is not particularly limited, and any known method such as air drying or vacuum drying can be employed. However, the studies conducted by the present inventors have revealed that the cake is more easily cracked when dried under reduced pressure than when dried under atmospheric pressure. Therefore, vacuum drying is preferably employed.

The higher drying temperature is more advantageous from the viewpoint of efficiency of the decomposition of the coagulant and making the surface-treated silica-based composite oxide easy to crack. However, if the drying temperature is too high, the reactive substituent on the surface of the surface-treated silica-based composite oxide particles may produce aggregates, which is not preferable. Therefore, in order to keep these factors in balance, the drying temperature is preferably 35° C. to 200° C., more preferably 50° C. to 180° C., and particularly preferably 80° C. to 150° C.

The drying time is not particularly limited, but drying for about 2 hours to about 48 hours can sufficiently dry the surface-treated silica-based composite oxide.

In addition, the cracking may be preferably performed after the drying. In this case, a jet mill or a ball mill may be used in the same manner as in the cracking performed before the surface treatment.

<Concentration and Drying>

In the production of the surface-treated silica-based composite oxide powder of the present invention, the filtration and drying described above performed to recover the surface-treated silica-based composite oxide from the filtrate can be replaced with removal of the solvent by volatilization. For example, the surface-treated silica-based composite oxide particle dispersion that has been recovered as the filtrate by the wet filtration is concentrated by heating, or concentrated under reduced pressure, to volatilize the solvent. This makes it possible to directly obtain the surface-treated silica-based composite oxide from the filtrate which contains the surface-treated silica-based composite oxide particles dispersed therein and from which the solvent has been removed.

<Surface-Treated Silica-Based Composite Oxide Particles>

The surface-treated silica-based composite oxide powder of the present invention produced in the above-described manner is in the form of dry powder in which the particles are weakly aggregated together. The surface-treated silica-based composite oxide particles do not produce aggregates that are difficult to crack, and thus, can be easily cracked and have good dispersibility. The surface-treated silica-based composite oxide particles can be easily cracked by the shear of a disperser for dispersing the particles into a resin or a solvent, and can be uniformly dispersed in the resin or the solvent, without performing any special cracking process. For example, in a 5 mass % dispersion of the surface-treated silica-based composite oxide powder obtained by ultrasonic irradiation (at an output of 40 W for 10 minutes), a content of particles having a particle diameter of 5 μm or more in a particle size distribution obtained by the Coulter counter method (aperture diameter: 30 μm) is 10 ppm or less on a number basis.

The silica-based composite oxide powder of the present invention may be prepared by a different production method, or may be mixed with a plurality of batch products. For example, in the synthesis of particles by the sol-gel reaction as described above, the coefficient of variation is preferably smaller (the particle size distribution is preferably narrower) because the possibility of the production of the coarse particles is lowered. On the other hand, in practical use, for example, if the powder is mixed with a resin for use, the powder may preferably have a particle size distribution which is broad to some extent (a large coefficient of variation) in order to increase the filling rate. In such a case, if composite oxide particles of a plurality of lots having different mean particle diameters are mixed, the particle size distribution may be broadened to increase the filling rate. In this case, if the amount of coarse particles in each lot is 10 ppm or less, the amount of coarse particles in the resulting mixture can also be 10 ppm or less. Thus, desired physical properties can be exhibited if a plurality of lots are mixed as described above.

The silica-based composite oxide and surface-treated silica-based composite oxide of the present invention contain only a small amount of coarse particles and aggregated particles. The surface-treated silica-based composite oxide, which is uniformly surface-treated, has remarkably improved dispersibility in a resin, reduced viscosity when added to a resin composition, and is able to be highly introduced into a resin to improve the strength of a cured resin. Thus, the surface-treated silica composite oxide is particularly suitably used for a filler of a semiconductor encapsulation material used to seal narrow gaps. Further, the surface-treated silica-based composite oxide can be used for various kinds of semiconductor encapsulation materials other than those for sealing the narrow gaps, fillers for films and paints, substrates for electronic materials, high-purity silica glass and quartz glass for semiconductor production apparatuses, and optical glass.

EXAMPLES

Hereinafter, the present invention will be described in more detail by way of examples, but the present invention is not limited to the examples.

Physical properties used for evaluation of the following examples and comparative examples were evaluated as follows.

Amounts of Coarse Particles of 5 μm or More and 3 μm or More Measured by the Coulter Counter Method)

Five 50-mL glass bottles were provided, in each of which 1 g of silica-based composite oxide powder weighed by an electronic balance, and 19 g of distilled water or ethanol were added, and the powder was dispersed using an ultrasonic homogenizer (Sonifier 250 manufactured by Branson Ultrasonics Corporation) at 40 W for 10 minutes to obtain measurement samples. The particle diameters of the respective silica-based composite oxide particles in each sample were measured using a Coulter counter (Multisizer III manufactured by Beckman Coulter, Inc.) with an aperture diameter of 30 μm. At that time, approximately 50,000 particles were measured from each sample, i.e., approximately 250,000 particles in total were measured from the five samples. Among them, the numbers of particles having particle diameters of 5 μm or more and 3 μm or more are calculated as the amounts of coarse particles (ppm) relative to the total number of particles measured.

(Volume-Based Cumulative 50% Diameter (Mean Particle Diameter), Coefficient of Variation, and Amount of Coarse Particles of 5 μm or More Measured by Laser Diffraction Scattering Method)

About 0.1 g of the silica-based composite oxide powder weighed by an electronic balance was placed in a 50 mL glass bottle, to which about 40 ml of distilled water was added, and the powder was dispersed using an ultrasonic homogenizer (Sonifier 250 manufactured by Branson Ultrasonics Corporation) at 40 W for 10 minutes. Then, the volume-based cumulative 50% diameter (μm) and coefficient of variation of the silica-based composite oxide powder were measured using a laser diffraction scattering particle size analyzer (LS-230 manufactured by Beckman Coulter, Inc.).

Further, the presence or absence of a signal indicative of the coarse particles of 5 μm or more was checked by the laser diffraction scattering method.

(Heating Loss)

Heating loss was determined using a simultaneous differential thermal analysis/thermogravimetric analysis instrument (TG-DTA, TG 8120 manufactured by Rigaku Corporation). Specifically, about 1 g of the silica-based composite oxide powder was placed in a glass petri dish having a diameter of 50 mm and a height of 12 mm, and stored under the conditions of 25° C. and 80% humidity for 24 hours. After 24 hours, the sample was taken out, about 10 mg of which was weighed by an electronic balance and placed in a sample holder. This was heated to 300° C. at a heating rate of 20° C./min under the air atmosphere, and retained at 300° C. for five hours. The amount of heating loss was calculated from a difference in weight before and after the heating.

(Sphericity)

The shapes of the silica-based composite oxide particles were observed with SEM (JSM-6060 manufactured by JEOL Ltd.) to obtain the sphericity. Specifically, 1000 or more silica-based composite oxide particles were observed, and the sphericity was measured for each of the particles using an image processing program (AnalySIS manufactured by Soft Imaging System GmbH, Inc.), and an average thereof was determined. The sphericity was calculated by the following equation.

Sphericity=4π×(area)/(circumference length)$^2$ (Refractive Index)

The refractive index of the silica-based composite oxide particles was measured by the liquid immersion method. Specifically, solvents having different refractive indices (e.g., toluene, 1-bromonaphthalene, 1-chloronaphthalene, diiodomethane, and diiodomethane with sulfur) were appropriately blended to prepare a solvent mixture having an arbitrary refractive index, in which the particles were dispersed. Then, the refractive index of the most transparent particle dispersion at 25° C. was taken as the refractive index of the particles. The refractive index of the solvent was measured using an Abbe's refractometer using light of a wavelength of 589 nm at 25° C.

(Carbon Content and Carbon Content Per Unit Surface Area)

The carbon content (mass %) of the surface-treated silica-based composite oxide particles was measured by the combustion oxidation method (EMIA-511 manufactured by Horiba, Ltd.).

Further, the specific surface area (m$^2$/g) of the surface-treated silica-based composite oxide particles was measured by a BET single-point method based on the amount of nitrogen adsorption using a specific surface area measuring system SA-1000 manufactured by Sibata Scientific Technology, Ltd. The carbon content per unit surface area (mass %·g/m$^2$) was calculated by dividing the carbon content by the specific surface area.

(Amount of Impurities)

U and Th: The silica-based composite oxide powder was heated and dissolved in fluonitric acid (a mixed solution of hydrofluoric acid and nitric acid in a ratio of 5:1), and a measurement was performed by ICP mass spectrometry (Agilent 4500 manufactured by Agilent Technologies, Inc.).

Fe, Al, Na, K, Ca, Cr, and Ni: The silica-based composite oxide powder was heated and dissolved in fluonitric acid, and the residue was measured by ICP emission spectrometry (iCAP6500DUO manufactured by Thermo Scientific).

Cl$^-$: The sol-gel silica-based composite oxide powder was mixed with ultrapure water, and heated under pressure. The concentration of Cl$^-$ in the heated solution was measured by ion chromatography (ICS-2100 manufactured by Nippon Dionex).

(α Ray Emission)

The α ray emission (c/(cm$^2$·h)) of the silica-based composite oxide powder was measured using a low-level α ray measuring device (LACS-4000M manufactured by Sumika Chemical Analysis Service, Ltd.). The measurement was carried out on a sample area of 1000 cm$^2$.

(Amount of Isolated Silanol Groups)

A measurement sample was prepared by mixing 0.02 g of the calcined silica-based composite oxide powder previously dried at 110° C. for 24 hours and 0.38 g of KBr, and grinding the resulting mixture in an agate mortar. The absorbance of the measurement sample was measured by a diffuse reflectance method using a Fourier transform infrared spectrometer (FT-IR, FTS-3000 manufactured by Agilent Technologies, Inc.). The data of the absorbance was normalized at 1874 cm$^{-1}$ which is a vibration strength of Si—O—Si in a silica skeleton, and a ratio between the strength ($I_1$) of the isolated silanol groups at a wave number of 3744 cm$^{-1}$ and the vibration strength ($I_2$) of Si—O—Si in the silica skeleton at a wave number of 1874 cm$^{-1}$ was calculated. Then, the amount of the isolated silanol groups was calculated from the following formula.

The amount of isolated silanol groups=$I_1/I_2$

The isolated silanol groups are silanol groups that are not hydrogen-bonded to adsorption water or adjacent silanol groups. Therefore, the isolated silanol groups are substantially absent in the non-calcined silica-based composite oxide, and are not measured. In other words, the isolated silanol groups are not observed until the amount of silanol groups is reduced by the calcination.

(Flow Mark)

To 25 g of a mixture of bisphenol A and F type mixed epoxy resin (ZX-1059 manufactured by Nippon Steel Sumikin Chemical Co., Ltd.), 25 g of the silica-based composite oxide fine powder was added, and the resulting mixture was hand-kneaded. The hand-kneaded resin composition was pre-kneaded (kneading: 1000 rpm, eight minutes, degassing: 2000 rpm, two minutes) in a planetary centrifugal mixer (Awatori Neritaro AR-500, manufactured by THINKY Co., Ltd.). The pre-kneaded resin composition was kneaded using a three-roll mill (BR-150HCV, roll diameter: 63.5, manufactured by Aimex Co., Ltd.). The kneading was performed a total of five times at room temperature as a kneading temperature, with an interval between rolls set to 20 μm. Two glass sheets were stacked with a gap of 30 μm left therebetween, and heated to 100° C. to perform a high-temperature entry test of the kneaded resin composition thus prepared. Observation was performed until the kneaded resin composition enters the gap by 20 mm or the resin composition stops entering the gap, and the presence or absence of flow marks was visually checked.

Example 1

In a 3 L four-neck glass flask, 475 g of tetramethoxysilane (methyl orthosilicate manufactured by Tama Chemicals Co., Ltd., will be hereinafter referred to as "TMOS") as metal alkoxide was charged, to which 238 g of methanol as an organic solvent (11 mass % relative to the mass of an inorganic oxide particle dispersion) and 56 g of 0.035 mass % hydrochloric acid as an acid catalyst (0.003 mass % as a content of hydrogen chloride relative to the mass of metal alkoxide) were added. Then, the mixture was stirred at room temperature for 10 minutes to hydrolyze TMOS. Subsequently, to the resulting mixture, a liquid obtained by diluting 250 g of titanium tetraisopropoxide (A-1 manufactured by Nippon Soda Co., Ltd., will be hereinafter referred to as "TPT") as metal alkoxide with 500 g (23 mass % relative to the mass of the inorganic oxide particle dispersion) of isopropyl alcohol (will be hereinafter referred to as "IPA") was added, to obtain a transparent composite alkoxide solution.

In a 5 L separable five-neck glass flask with a jacket (15 cm in diameter, cylindrical), a baffle plate and a FULL-ZONE impeller (impeller diameter: 8 cm) were installed, and 256 g of IPA (12 mass %, 46 mass % in total, relative to the mass of the inorganic oxide particle dispersion) and 64 g of 25 mass % ammonia water (2.2 mass % as an ammonia content relative to the mass of metal alkoxide) were charged therein. Then, the contents were retained and stirred at 40° C. To the resulting mixture, the composite alkoxide solution and 344 g of 25 mass % ammonia water (3.9 mass %, 6 mass % in total, as the ammonia content relative to the mass of metal alkoxide) were separately added dropwise. At the start of the dropwise addition, the composite alkoxide solution and the ammonia water were supplied into a reaction medium at throughput linear velocities of 10 mm/s and 0.2 mm/s, respectively. Thereafter, the supply amount was gradually increased to supply the composite alkoxide solution and the ammonia water at final throughput linear velocities of 51 mm/s and 10 mm/s, respectively, and the supply was finished in five hours. Then, silica-titania composite oxide particles were allowed to grow. The dimensionless mixing time nθm at that time was 50. The reaction liquid became cloudy nine minutes after the start of the dropwise addition, i.e., it was confirmed that the reaction was proceeding. The mass of the silica-titania composite oxide particle dispersion was 2183 g.

After the end of the dropwise addition, aging was performed for 1.0 hours, and the resulting slurry was transferred to a 10 L polyethylene container through a polypropylene filter having a pore size of 3 μm. Then, 143 g of dry ice (solid carbon dioxide, 58 mass % relative to inorganic oxide particles in the dispersion) was added thereto, and left stand for three hours. After three hours, the silica-titania composite oxide particles were precipitated. Using quantitative filter paper (retaining particle diameter: 5 μm), vacuum filtration was performed to obtain 398 g of a concentrate (silica-titania composite oxide concentration: 62 mass %). The filtrate was transparent, and no filtration leakage was found. The obtained silica-titania composite oxide particles were vacuum-dried at 100° C. for 16 hours to obtain 260 g of silica-titania composite oxide. Further, calcination was carried out at 900° C. for 12 hours. The calcination was carried out in the air atmosphere without particular adjustment. After the calcination, the resulting product was not found to be sintered, and 247 g of silica-titania composite oxide powder was obtained.

The obtained silica-titania composite oxide powder had a mean particle diameter of 0.42 μm, a coefficient of variation of 23%, a sphericity of 0.92, and a refractive index of 1.62, and no coarse particles having a particle diameter of 5 μm or more were detected by the laser diffraction scattering method. In addition, the respective amounts of coarse particles having particle diameters of 5 μm or more and 3 μm or more measured by the Coulter counter method were 8 ppm and 24 ppm.

The amount of heating loss was 3%, and the amount of isolated silanol groups was 0.7. The α ray emission was 0.002 c/(cm$^2$·h). As for the impurities, the U content was 0.02 ppb, the Th content was 0.02 ppb, the Fe content was 0.1 ppm, the Al content was 0.1 ppm, the Na content was 0.1 ppm, the K content was 0.0 ppm, the Ca content was 0.1 ppm, the Cr content was 0.0 ppm, the Ni content was 0.0 ppm, and the Cl$^-$ content was 0.1 ppm. No flow marks were found.

Example 2

Steps performed after the calcination in Example 1 were skipped.

The obtained silica-titania composite oxide powder had a mean particle diameter of 0.47 μm, coefficient of variation of 24%, a sphericity of 0.92, and a refractive index of 1.59, and no coarse particles having a particle diameter of 5 μm or more were detected by the laser diffraction scattering method. The respective amounts of coarse particles having particle diameters of 5 μm or more and 3 μm or more measured by the Coulter counter method were less than 4 ppm and 5 ppm.

The amount of heating loss was 18%. The α ray emission was 0.002 c/(cm$^2$·h). As for the impurities, the U content was 0.02 ppb, the Th content was 0.01 ppb, the Fe content was 0.1 ppm, the Al content was 0.0 ppm, the Na content was 0.2 ppm, the K content was 0.0 ppm, the Ca content was 0.1 ppm, the Cr content was 0.0 ppm, the Ni content was 0.0 ppm, and the Cl$^-$ content was 0.1 ppm. No flow marks were found.

Example 3

Silica-zirconia composite oxide powder was synthesized in the same manner as in Example 1 except that 180 g of tetra-n-butoxyzirconium (TBZR manufactured by Nippon Soda Co., Ltd. (will be hereinafter referred to as "TBZ")) was used in place of 250 g of TPT, and the amount of hydrochloric acid was changed to 30 g. Thus, 238 g of silica-zirconia composite oxide powder was obtained.

The obtained silica-zirconia composite oxide powder had a mean particle diameter of 0.32 μm, a coefficient of variation of 19%, a sphericity of 0.95, and a refractive index of 1.53, and no coarse particles having a particle diameter of 5 μm or more were detected by the laser diffraction scattering method. The respective amounts of coarse particles having particle diameters of 5 μm or more and 3 μm or more measured by the Coulter counter method were 9 ppm and 32 ppm.

The amount of heating loss was 3%, and the amount of isolated silanol groups was 0.6. The α ray emission was 0.002 c/(cm$^2$·h). As for the impurities, the U content was 0.02 ppb, the Th content was 0.02 ppb, the Fe content was 0.1 ppm, the Al content was 0.1 ppm, the Na content was 0.1 ppm, the K content was 0.1 ppm, the Ca content was 0.1 ppm, the Cr content was 0.0 ppm, the Ni content was 0.0 ppm, and the Cl$^-$ content was 0.1 ppm. No flow marks were found.

Example 4

A 2 L glass Erlenmeyer flask was charged with 363 g of TMOS, to which 181 g of methanol and 42 g of 0.04 mass % hydrochloric acid were added while stirring, and the mixture was stirred at room temperature for about 20 minutes to partially hydrolyze tetramethoxysilane (the solution thus prepared was referred to as "solution A1").

Separately from the above, 410 g of TPT, 500 g of IPA, and 107 g of triethanolamine (manufactured by Wako Pure Chemical Industries, Ltd., hereinafter referred to as "TEA") as a complexing agent were mixed and stirred at room temperature for 30 minutes, and the resulting mixture was mixed with the solution A1, and stirred for 30 minutes (the solution thus prepared will be referred to as "solution B1").

A silica-titania composite oxide powder was synthesized in the same manner as in Example 1 except that the solution B1 was used as the composite alkoxide solution used in Example 1. Thus, 249 g of silica-titania composite oxide powder was obtained.

The obtained silica-titania composite oxide powder had a mean particle diameter of 0.42 μm, a coefficient of variation of 25%, a sphericity of 0.88, and a refractive index of 1.74, and no coarse particles having a particle diameter of 5 μm or more were detected by the laser diffraction scattering method. The respective amounts of coarse particles having particle diameters of 5 μm or more and 3 μm or more measured by the Coulter counter method were 9 ppm and 31 ppm.

The amount of heating loss was 3%, and the amount of isolated silanol groups was 0.9. The α ray emission was 0.002 c/(cm²·h). As for the impurities, the U content was 0.02 ppb, the Th content was 0.02 ppb, the Fe content was 0.1 ppm, the Al content was 0.1 ppm, the Na content was 0.1 ppm, the K content was 0.0 ppm, the Ca content was 0.1 ppm, the Cr content was 0.0 ppm, the Ni content was 0.0 ppm, and the Cl⁻ content was 0.1 ppm. No flow marks were found.

Example 5

The amount of IPA in the reaction liquid used was changed from 256 g used in Example 1 to 128 g, and 128 g of methanol was added thereto. Except for the above, the synthesis was performed in the same manner as in Example 1, thereby obtaining 241 g of silica-titania composite oxide powder.

The obtained silica-titania composite oxide powder had a mean particle diameter of 0.28 μm, a coefficient of variation of 21%, a sphericity of 0.93, and a refractive index of 1.62, and no coarse particles having a particle diameter of 5 μm or more were detected by the laser diffraction scattering method. The respective amounts of coarse particles having particle diameters of 5 μm or more and 3 μm or more measured by the Coulter counter method were 4 ppm and 20 ppm.

The amount of heating loss was 3%, and the amount of isolated silanol groups was 0.4. The α ray emission was 0.002 c/(cm²·h). As for the impurities, the U content was 0.01 ppb, the Th content was 0.02 ppb, the Fe content was 0.1 ppm, the Al content was 0.0 ppm, the Na content was 0.1 ppm, the K content was 0.0 ppm, the Ca content was 0.1 ppm, the Cr content was 0.0 ppm, the Ni content was 0.0 ppm, and the Cl⁻ content was 0.1 ppm. No flow marks were found.

Example 6

The amounts of TPT and IPA in the composite alkoxide solution of Example 1 were changed to 77 g and 154 g, respectively. Except for the above, the synthesis was performed in the same manner as in Example 1, thereby obtaining 241 g of silica-titania composite oxide powder.

The obtained silica-titania composite oxide powder had a mean particle diameter of 0.60 μm, a coefficient of variation of 17%, a sphericity of 0.96, and a refractive index of 1.51, and no coarse particles having a particle diameter of 5 μm or more were detected by the laser diffraction scattering method. The respective amounts of coarse particles having particle diameters of 5 μm or more and 3 μm or more measured by the Coulter counter method were 4 ppm and 9 ppm.

The amount of heating loss was 3%, and the amount of isolated silanol groups was 0.4. The α ray emission was 0.002 c/(cm²·h). As for the impurities, the U content was 0.02 ppb, the Th content was 0.02 ppb, the Fe content was 0.1 ppm, the Al content was 0.1 ppm, the Na content was 0.1 ppm, the K content was 0.1 ppm, the Ca content was 0.1 ppm, the Cr content was 0.0 ppm, the Ni content was 0.0 ppm, and the Cl⁻ content was 0.1 ppm. No flow marks were found.

Example 7

In a glass lining reactor with a jacket (inner diameter: 1200 mm) having an inner volume of 1 m³, a MAXBLEND impeller (impeller diameter: 345 mm) was installed, and 190.0 kg of TMOS was charged as metal alkoxide, to which 95.2 kg of methanol as an organic solvent, and 22.4 kg of 0.035 mass % hydrochloric acid as an acid catalyst were added. Then, the mixture was stirred at room temperature for 10 minutes to hydrolyze TMOS. Subsequently, to the resulting mixture, a liquid obtained by diluting 100.0 kg of TPT as metal alkoxide with 200.0 kg of IPA was added to obtain a transparent composite alkoxide solution.

In a glass lining reactor with a jacket (inner diameter: 1200 mm) having an inner volume of 1 m³, a MAXBLEND impeller (impeller diameter: 345 mm) was installed, and 102.4 kg of IPA and 25.6 kg of 25 mass % ammonia water were charged as a reaction liquid, which was retained and stirred at 40° C. To the resulting mixture, the composite alkoxide solution and 137.6 kg of 25 mass % ammonia water were separately added dropwise using SUS pipes (inner diameter: 3/8 inch). At the start of the dropwise addition, the composite alkoxide solution and the ammonia water were supplied into a reaction medium at throughput linear velocities of 10 mm/s and 0.2 mm/s, respectively. Thereafter, the supply amount was gradually increased to supply the composite alkoxide solution and the ammonia water at final discharge linear velocities of 51 mm/s and 10 mm/s, respectively, and the supply was finished in five hours. Then, silica-titania composite oxide particles were allowed to grow. The dimensionless mixing time nθm at that time was 45. The reaction liquid became cloudy seven minutes after the start of the dropwise addition, i.e., it was confirmed that the reaction was proceeding. The mass of the silica-titania composite oxide particle dispersion was 869.2 kg.

After the end of the dropwise addition, aging was performed for 1.0 hours, and the resulting slurry was transferred to a reactor having an inner volume of 1 m³ through a polypropylene filter having a pore size of 3 μm. Then, 57.2 kg of dry ice (solid carbon dioxide, 58 mass % relative to inorganic oxide particles in the dispersion) was added thereto, and left stand for three hours. After three hours, the silica-titania composite oxide particles were precipitated. Using quantitative filter paper (retaining particle diameter: 5 μm), vacuum filtration was performed to obtain 158.0 kg of a concentrate (silica-titania composite oxide concentration: 60 mass %). The filtrate was transparent, and no filtration leakage was found. The obtained silica-titania composite oxide particles were vacuum-dried at 100° C. for 16 hours to obtain 99.4 kg of silica-titania composite oxide. Further, calcination was carried out at 900° C. for 12 hours. The calcination was carried out in the air atmosphere without particular adjustment. After the calcination, the resulting product was not found to be sintered, and 94.8 kg of silica-titania composite oxide powder was obtained.

The obtained silica-titania composite oxide powder had a mean particle diameter of 0.45 μm, a coefficient of variation of 26%, a sphericity of 0.93, and a refractive index of 1.62, and no coarse particles having a particle diameter of 5 μm or more were detected by the laser diffraction scattering method. The respective amounts of coarse particles having particle diameters of 5 μm or more and 3 μm or more measured by the Coulter counter method were 9 ppm and 36 ppm.

The amount of heating loss was 3%, and the amount of isolated silanol groups was 0.8. The α ray emission was 0.002 c/(cm²·h). As for the impurities, the U content was 0.02 ppb, the Th content was 0.01 ppb, the Fe content was 0.0 ppm, the Al content was 0.0 ppm, the Na content was 0.1 ppm, the K content was 0.1 ppm, the Ca content was 0.1 ppm, the Cr content was 0.0 ppm, the Ni content was 0.0 ppm, and the Cl⁻ content was 0.1 ppm. No flow marks were found.

Example 8

The silica-titania composite oxide powder obtained in Example 7 was subjected to cracking using a jet mill.

The obtained silica-titania composite oxide powder had a mean particle diameter of 0.45 μm, a coefficient of variation of 25%, a sphericity of 0.93, and a refractive index of 1.62, and no coarse particles having a particle diameter of 5 μm or more were detected by the laser diffraction scattering method. The respective amounts of coarse particles having particle diameters of 5 μm or more and 3 μm or more measured by the Coulter counter method were less than 4 ppm and 5 ppm.

The amount of heating loss was 3%, and the amount of isolated silanol groups was 0.6. The α ray emission was 0.002 c/(cm$^2$·). As for the impurities, the U content was 0.02 ppb, the Th content was 0.02 ppb, the Fe content was 0.4 ppm, the Al content was 2.2 ppm, the Na content was 0.1 ppm, the K content was 0.0 ppm, the Ca content was 0.1 ppm, the Cr content was 0.1 ppm, the Ni content was 0.1 ppm, and the Cl⁻ content was 0.1 ppm. No flow marks were found.

Example 9

In a V-blender (type V-60, manufactured by TOKUJU Co., Ltd.) having an inner volume of 136 L, 40 kg of the silica-titania composite oxide powder obtained in Example 8 was charged, and the atmosphere was replaced with nitrogen. The V-blender had rotary shafts on the respective inner wall surfaces at both ends, and a stainless steel cracking blade (150 mm×20 mm×2 mm) was provided for each of the rotary shafts at a position apart from the corresponding inner wall surface by 2 cm, with the rotary shaft passing the center of gravity of the blade. Next, 258 g (40 μmol/g) of hexamethyldisilazane (SZ-31 manufactured by Shin-Etsu Silicone, will be hereinafter referred to as "HMDS") was added dropwise as a surface treatment agent using a peristaltic pump. After the total amount of the surface treatment agent was dropped, the stainless steel cracking blade (mass: 47 g) was rotated at the number of revolutions of 157 rad/s (1500 rpm) (cracking energy=0.7 J), and the blender was operated at the number of revolutions of 0.3 rps, to blend the mixture at room temperature for three hours.

Then, the surface-treated silica-titania composite oxide powder thus blended was taken out of the blender, and divided into portions of 10 kg each, which were heated at 150° C. for three hours in a dryer in which the atmosphere was substituted with nitrogen.

Then, the surface-treated silica-titania composite oxide powder was wet-filtered.

In a SUS container having an inner volume of 40 L, 15 kg of methanol was placed, to which 5 kg of the surface-treated silica-titania composite oxide powder was added while stirring with a propeller stirrer at a stirring speed of 100 rpm, and the stirring was continued for 60 minutes, thereby preparing a dispersion having a slurry concentration of 25 mass %. Then, the dispersion was delivered with a diaphragm pump at a rate of 1 L/min, and allowed to pass through a polypropylene filter having a pore size of 3 μm to remove the coarse particles. The filtered dispersion was subjected to pressure filtration using a filter cloth having a permeability of 0.6 cm$^3$/(cm$^2$·s), and 6 kg of the surface-treated silica-titania composite oxide was recovered as a cake.

The cake of the surface-treated silica-titania composite oxide thus recovered was dried under reduced pressure at a temperature of 120° C. for 24 hours to obtain 4.8 kg of dried, surface-treated silica-titania composite oxide powder.

The obtained surface-treated silica-titania composite oxide powder had a mean particle diameter of 0.45 μm, a coefficient of variation of 26%, a sphericity of 0.93, a refractive index of 1.62, a carbon content of 0.09 mass %, and a carbon content per unit surface area of 0.01 mass %·g/m$^2$, and no coarse particles having a particle diameter of 5 μm or more were detected by the laser diffraction scattering method. The respective amounts of coarse particles having particle diameters of 5 μm or more and 3 μm or more measured by the Coulter counter method were 4 ppm and 9 ppm.

The amount of heating loss was 1%, and the amount of isolated silanol groups was 0.0. The α ray emission was 0.002 c/(cm$^2$·h). As for the impurities, the U content was 0.02 ppb, the Th content was 0.02 ppb, the Fe content was 0.4 ppm, the Al content was 2.3 ppm, the Na content was 0.1 ppm, the K content was 0.1 ppm, the Ca content was 0.1 ppm, the Cr content was 0.1 ppm, the Ni content was 0.1 ppm, and the Cl⁻ content was 0.1 ppm. No flow marks were found.

Example 10

In place of hexamethyldisilazane used as the surface treatment agent in Example 9, 187 g (20 μmol/g) of acryloxypropyltrimethoxysilane (KBM-5103 manufactured by Shin-Etsu Silicone Co., Ltd., will be hereinafter referred to as "AcPTS") was added dropwise using a peristaltic pump. Except for the above, the surface treatment was performed in the same manner as in Example 9.

The obtained surface-treated silica-titania composite oxide powder had a mean particle diameter of 0.45 μm, a coefficient of variation of 26%, a sphericity of 0.93, a refractive index of 1.62, a carbon content of 0.17 mass %, and a carbon content per unit surface area of 0.03 mass %·g/m$^2$, and no coarse particles having a particle diameter of 5 μm or more were detected by the laser diffraction scattering method. The respective amounts of coarse particles having particle diameters of 5 μm or more and 3 μm or more measured by the Coulter counter method were less than 4 ppm and 8 ppm.

The amount of heating loss was 1%, and the amount of isolated silanol groups was 0.0. The α ray emission was 0.002 c/(cm$^2$·h). As for the impurities, the U content was 0.02 ppb, the Th content was 0.02 ppb, the Fe content was 0.3 ppm, the Al content was 2.2 ppm, the Na content was 0.1 ppm, the K content was 0.0 ppm, the Ca content was 0.1 ppm, the Cr content was 0.1 ppm, the Ni content was 0.1 ppm, and the Cl⁻ content was 0.1 ppm. No flow marks were found.

Example 11

The preparation of the composite alkoxide solution in Example 1 was performed in a 10 L four-neck glass flask, using 2930 g of TMOS, 1460 g of methanol, 690 g of 0.035 mass % hydrochloric acid, 470 g of TPT, and 940 g of IPA. A 20 L five-neck container made of SUS (25 cm in diameter, cylindrical) was used as the reactor, in which 3150 g of IPA and 790 g of 25 mass % ammonia water were charged as the reaction liquid. To the resulting mixture, the composite alkoxide solution and 4230 g of 25 mass % ammonia water were separately added dropwise. Except for the above, the synthesis was performed in the same manner as in Example 1, thereby obtaining 880 g of silica-titania composite oxide powder.

The obtained silica-titania composite oxide powder had a mean particle diameter of 1.12 μm, a coefficient of variation of 34%, a sphericity of 0.87, and a refractive index of 1.51, and no coarse particles having a particle diameter of 5 μm or more were detected by the laser diffraction scattering method. The respective amounts of coarse particles having particle diameters of 5 μm or more and 3 μm or more measured by the Coulter counter method were 9 ppm and 55 ppm. The amount of heating loss was 3%, and the amount of isolated silanol groups was 0.4. The α ray emission was 0.002 c/(cm²·h). As for the impurities, the U content was 0.02 ppb, the Th content was 0.02 ppb, the Fe content was 0.1 ppm, the Al content was 0.1 ppm, the Na content was 0.1 ppm, the K content was 0.1 ppm, the Ca content was 0.1 ppm, the Cr content was 0.0 ppm, the Ni content was 0.0 ppm, and the content was 0.1 ppm. No flow marks were found.

Example 12

In place of hexamethyldisilazane used as the surface treatment agent in Example 9, 189 g (20 μmol/g) of 3-glycidoxypropyltrimethoxysilane (KBM-403 manufactured by Shin-Etsu Silicone Co., Ltd., will be hereinafter referred to as "GPTS") was added dropwise using a peristaltic pump. Except for the above, the surface treatment was performed in the same manner as in Example 10.

The obtained surface-treated silica-titania composite oxide powder had a mean particle diameter of 0.47 μm, a coefficient of variation of 28%, a sphericity of 0.93, a refractive index of 1.62, a carbon content of 0.16 mass %, and a carbon content per unit surface area of 0.02 mass %·g/m², and no coarse particles having a particle diameter of 5 μm or more were detected by the laser diffraction scattering method. The respective amounts of coarse particles having particle diameters of 5 μm or more and 3 μm or more measured by the Coulter counter method were less than 4 ppm and 8 ppm. The amount of heating loss was 1%, and the amount of isolated silanol groups was 0.0. The α ray emission was 0.002 c/(cm²·h). As for the impurities, the U content was 0.02 ppb, the Th content was 0.02 ppb, the Fe content was 0.2 ppm, the Al content was 2.2 ppm, the Na content was 0.1 ppm, the K content was 0.0 ppm, the Ca content was 0.1 ppm, the Cr content was 0.1 ppm, the Ni content was 0.1 ppm, and the Cl content was 0.1 ppm. No flow marks were found.

Comparative Example 1

Filtration with a filter having a pore size of 3 μm performed in Example 1 was skipped. Except for the above, the same procedure as that of Example 1 was carried out.

The obtained silica-titania composite oxide powder had a mean particle diameter of 0.46 μm, a coefficient of variation of 34%, a sphericity of 0.90, and a refractive index of 1.62, and no coarse particles having a particle diameter of 5 μm or more were detected by the laser diffraction scattering method. The respective amounts of coarse particles having particle diameters of 5 μm or more and 3 μm or more measured by the Coulter counter method were 100 ppm and 2400 ppm.

The amount of heating loss was 3%, and the amount of isolated silanol groups was 0.6. The α ray emission was 0.002 c/(cm²·h). As for the impurities, the U content was 0.02 ppb, the Th content was 0.02 ppb, the Fe content was 0.1 ppm, the Al content was 0.1 ppm, the Na content was 0.1 ppm, the K content was 0.0 ppm, the Ca content was 0.1 ppm, the Cr content was 0.0 ppm, the Ni content was 0.0 ppm, and the content was 0.1 ppm. Flow marks were found.

Comparative Example 2

Filtration with a filter having a pore size of 3 μm performed in Example 4 was skipped, and no TEA added in Example 4 was added as the complexing agent. Except for the above, the same procedure as that of Example 4 was carried out.

The obtained silica-titania composite oxide powder had a mean particle diameter of 0.61 μm, a coefficient of variation of 60%, a sphericity of 0.71, and a refractive index of 1.74, and 5% by volume of the coarse particles having a particle diameter of 5 μm or more were detected by the laser diffraction scattering method. Since the coarse particles were detected by the laser diffraction scattering method, the amount of coarse particles was not measured by the Coulter counter method.

The amount of heating loss was 3%, and the amount of isolated silanol groups was 0.7. The α ray emission was 0.002 c/(cm²·h). As for the impurities, the Fe content was 0.1 ppm, the Al content was 0.1 ppm, the Na content was 0.1 ppm, the K content was 0.0 ppm, the Ca content was 0.1 ppm, the Cr content was 0.0 ppm, the Ni content was 0.0 ppm, and the Cl⁻ content was 0.1 ppm. Flow marks were found.

Comparative Example 3

Wet filtration of the surface-treated silica-titania composite oxide powder performed in Example 9 was skipped. Except for the above, the same procedure as that of Example 9 was carried out.

The obtained surface-treated silica-titania composite oxide powder had a mean particle diameter of 0.47 μm, a coefficient of variation of 28%, a sphericity of 0.93, a refractive index of 1.62, a carbon content of 0.09 mass %, and a carbon content per unit surface area of 0.01 mass %·g/m², and no coarse particles having a particle diameter of 5 μm or more were detected by the laser diffraction scattering method. The respective amounts of coarse particles having particle diameters of 5 μm or more and 3 μm or more measured by the Coulter counter method were 30 ppm and 280 ppm. The amount of heating loss was 1%, and the amount of isolated silanol groups was 0.0. The α ray emission was 0.002 c/(cm²·h). As for the impurities, the U content was 0.02 ppb, the Th content was 0.02 ppb, the Fe content was 0.3 ppm, the Al content was 2.2 ppm, the Na content was 0.1 ppm, the K content was 0.1 ppm, the Ca content was 0.1 ppm, the Cr content was 0.1 ppm, the Ni content was 0.1 ppm, and the Cl⁻ content was 0.1 ppm. Flow marks were found.

In this comparative example, the wet filtration after the surface treatment was not performed. Thus, the amounts of coarse particles of 5 μm or more and 3 μm or more measured by the Coulter counter method were larger than those measured in Examples 9, 10, and 12.

Comparative Example 4

The calcination performed in Example 1 was carried out at a calcination temperature of 1000° C. Except for the above, the same procedure as that of Example 1 was carried out.

The obtained silica-titania composite oxide powder had a mean particle diameter of 0.43 μm, a coefficient of variation of 25%, a sphericity of 0.91, and a refractive index of 1.62, and no coarse particles having a particle diameter of 5 μm or more were detected by the laser diffraction scattering method. The respective amounts of coarse particles having particle diameters of 5 μm or more and 3 μm or more measured by the Coulter counter method were 50 ppm and 680 ppm. The amount of heating loss was 1%, and the amount of isolated silanol groups was 0.2. The α ray emission was 0.002 c/(cm²·h). As for the impurities, the U content was 0.02 ppb, the Th content was 0.02 ppb, the Fe content was 0.1 ppm, the Al content was 0.1 ppm, the Na content was 0.1 ppm, the K content was 0.0 ppm, the Ca content was 0.1 ppm, the Cr content was 0.0 ppm, the Ni content was 0.0 ppm, and the Cl⁻ content was 0.1 ppm. Flow marks were found.

Comparative Example 5

The calcination performed in Example 6 was carried out at a calcination temperature of 1000° C. Except for the above, the same procedure as that of Example 6 was carried out.

The obtained silica-titania composite oxide powder had a mean particle diameter of 0.64 μm, a coefficient of variation of 28%, a sphericity of 0.92, and a refractive index of 1.51, and no coarse particles having a particle diameter of 5 μm or more were detected by the laser diffraction scattering method. The respective amounts of coarse particles having particle diameters of 5 μm or more and 3 μm or more measured by the Coulter counter method were 35 ppm and 320 ppm. The amount of heating loss was 1%, and the amount of isolated silanol groups was 0.2. The α ray emission was 0.002 c/(cm²·h). As for the impurities, the U content was 0.02 ppb, the Th content was 0.02 ppb, the Fe content was 0.1 ppm, the Al content was 0.0 ppm, the Na content was 0.1 ppm, the K content was 0.0 ppm, the Ca content was 0.1 ppm, the Cr content was 0.0 ppm, the Ni content was 0.0 ppm, and the content was 0.1 ppm. Flow marks were found.

Example 13

The synthesis was performed in the same manner as in Example 1 except that the calcination temperature was 1000° C. (just like in Comparative Example 4), thereby obtaining 245 g of silica-titania composite oxide powder.

Then, 600 g of methanol was placed in a SUS container having an inner volume of 1 L, to which 200 g of the silica-titania composite oxide powder calcined at 1000° C. was added while stirring with a propeller stirrer at a stirring speed of 100 rpm, and the stirring was continued for 60 minutes, thereby preparing a dispersion having a slurry concentration of 25 mass %. Then, the dispersion was delivered with a diaphragm pump at a rate of 1 L/min, and allowed to pass through a polypropylene filter having a pore size of 3 μm to remove the coarse particles. The filtered dispersion was subjected to pressure filtration using a filter cloth having a permeability of 0.6 cm³/(cm²·s), and 205 g of the surface-treated silica-titania composite oxide was recovered as a cake.

The cake of the silica-titania composite oxide thus recovered was dried under reduced pressure at a temperature of 120° C. for 24 hours, thereby obtaining 190 g of dried silica-titania composite oxide powder.

The obtained silica-titania composite oxide powder had a mean particle diameter of 0.43 μm, a coefficient of variation of 24%, a sphericity of 0.92, and a refractive index of 1.62, and no coarse particles having a particle diameter of 5 μm or more were detected by the laser diffraction scattering method. The respective amounts of coarse particles having particle diameters of 5 μm or more and 3 μm or more measured by the Coulter counter method were 8 ppm and 32 ppm.

The amount of heating loss was 1%, and the amount of isolated silanol groups was 0.2. The α ray emission was 0.002 c/(cm²·h). As for the metal impurities, the U content was 0.02 ppb, the Th content was 0.02 ppb, the Fe content was 0.1 ppm, the Al content was 0.1 ppm, the Na content was 0.1 ppm, the K content was 0.1 ppm, the Ca content was 0.1 ppm, the Cr content was 0.0 ppm, the Ni content was 0.0 ppm, and the Cl⁻ content was 0.1 ppm. No flow marks were found.

TABLE 2

| | Metal Alkoxide | | | | Molar Proportion of Ti or Zr | Complexing Agent | | Filtration after Synthesis | Calcination |
|---|---|---|---|---|---|---|---|---|---|
| Ex. 1 | TMOS | 475 g | TPT | 250 g | 22 | None | — | Done | 900° C. |
| Ex. 2 | TMOS | 475 g | TPT | 250 g | 22 | None | — | Done | None |
| Ex. 3 | TMOS | 475 g | TBZ | 180 g | 13 | None | — | Done | 900° C. |
| Ex. 4 | TMOS | 363 g | TPT | 410 g | 38 | TEA | 107 g | Done | 900° C. |
| Ex. 5 | TMOS | 475 g | TPT | 250 g | 22 | None | — | Done | 900° C. |
| Ex. 6 | TMOS | 475 g | TPT | 77 g | 8 | None | — | Done | 900° C. |
| Ex. 7 | TMOS | 190 kg | TPT | 100 kg | 22 | None | — | Done | 900° C. |
| Ex. 8 | TMOS | 190 kg | TPT | 100 kg | 22 | None | — | Done | 900° C. |
| Ex. 9 | TMOS | 190 kg | TPT | 100 kg | 22 | None | — | Done | 900° C. |
| Ex. 10 | TMOS | 190 kg | TPT | 100 kg | 22 | None | — | Done | 900° C. |
| Ex. 11 | TMOS | 2930 g | TPT | 470 g | 21 | None | — | Done | 900° C. |
| Ex. 12 | TMOS | 190 kg | TPT | 100 kg | 22 | None | — | Done | 900° C. |
| Comp. Ex. 1 | TMOS | 475 g | TPT | 250 g | 22 | None | — | None | 900° C. |
| Comp. Ex. 2 | TMOS | 363 g | TPT | 410 g | 38 | None | — | None | 900° C. |

TABLE 2-continued

| | | | | | | | | | |
|---|---|---|---|---|---|---|---|---|---|
| Comp. Ex. 3 | TMOS | 190 kg | TPT | 100 kg | 22 | None | — | Done | 900° C. |
| Comp. Ex. 4 | TMOS | 475 g | TPT | 250 g | 22 | None | — | Done | 1000° C. |
| Comp. Ex. 5 | TMOS | 475 g | TPT | 77 g | 8 | None | — | Done | 1000° C. |
| Ex. 13 | TMOS | 475 g | TPT | 250 g | 22 | None | — | Done | 1000° C. |

| | Cracking | Surface Treatment | Filtration after Surface Treatment | Remarks |
|---|---|---|---|---|
| Ex. 1 | None | None | — | |
| Ex. 2 | — | — | — | Calcination of Ex. 1 was skipped. |
| Ex. 3 | None | None | — | Si—Zr particles |
| Ex. 4 | None | None | — | Complexing agent was used. |
| Ex. 5 | None | None | — | Particle diameter of Ex. 1 was reduced (solvent was changed). |
| Ex. 6 | None | None | — | Refractive index of Ex. 1 was lowered. |
| Ex. 7 | None | None | — | Synthesis in Ex. 1 in large scale |
| Ex. 8 | Done | None | — | Product of Ex. 7 was cracked by jet mill |
| Ex. 9 | Done | Done (HMDS) | Done | Product of Ex. 8 was surface treated. |
| Ex. 10 | Done | Done (AcPTM) | Done | Product of Ex. 8 was surface treated. |
| Ex. 11 | None | None | — | Particle diameter was increased. |
| Ex. 12 | Done | Done (GPTS) | Done | Product of Ex. 8 was surface treated. |
| Comp. Ex. 1 | Done | None | — | Filtration of Ex. 1 was skipped. |
| Comp. Ex. 2 | None | None | — | Complexing agent of Ex. 4 was not used. |
| Comp. Ex. 3 | Done | Done (HMDS) | None | Filtration after surface treatment of Ex. 9 was skipped. |
| Comp. Ex. 4 | None | None | — | Calcination temperature in Ex. 1 was changed. |
| Comp. Ex. 5 | None | None | — | Calcination temperature of Ex. 6 was changed. |
| Ex. 13 | None | None | — | Filtration after calcination of Comp. Ex. 4 was added. |

TMOS: Methyl Orthosilicate
TPT: Titanium Tetraisopropoxide
TBZ: tetra-N-Butoxyzirconium
TEA: Triethanolamine
HMDS: Hexamethyldisilazane
AcPTM: Acryloxypropyltrimethoxysilane
GPTS: 3-Glycidoxypropyltrimethoxysilane

TABLE 3

| | Mean Particle Diameter (μm) | Coefficient of Diameter (%) | Sphericity (—) | Refractive Index (—) | Laser Diffraction Scattering Method (vol %) 5 μm or more | Amount of Coarse Particles by Coulter Counter Method (ppm) | | Heating Loss (%) | Amount of Isolated Silanol Group | Flow Mark | Carbon content (mass %) |
|---|---|---|---|---|---|---|---|---|---|---|---|
| | | | | | | 5 μm or more | 3 μm or more | | | | |
| Ex. 1 | 0.42 | 23 | 0.92 | 1.62 | Not Detectable | 8 | 24 | 3 | 0.7 | Not Found | — |
| Ex. 2 | 0.47 | 24 | 0.92 | 1.59 | Not Detectable | <4 | 5 | 18 | — | Not Found | — |
| Ex. 3 | 0.32 | 19 | 0.95 | 1.53 | Not Detectable | 9 | 32 | 3 | 0.6 | Not Found | — |
| Ex. 4 | 0.42 | 25 | 0.88 | 1.74 | Not Detectable | 9 | 31 | 3 | 0.9 | Not Found | — |
| Ex. 5 | 0.28 | 21 | 0.93 | 1.62 | Not Detectable | 4 | 20 | 3 | 0.4 | Not Found | — |
| Ex. 6 | 0.60 | 17 | 0.96 | 1.51 | Not Detectable | <4 | 9 | 3 | 0.4 | Not Found | — |
| Ex. 7 | 0.45 | 26 | 0.93 | 1.62 | Not Detectable | 9 | 36 | 3 | 0.8 | Not Found | — |
| Ex. 8 | 0.45 | 25 | 0.93 | 1.62 | Not Detectable | <4 | 5 | 3 | 0.6 | Not Found | — |
| Ex. 9 | 0.45 | 26 | 0.93 | 1.62 | Not Detectable | <4 | 9 | 1 | 0.0 | Not Found | 0.09 |
| Ex. 10 | 0.45 | 26 | 0.93 | 1.62 | Not Detectable | <4 | 8 | 1 | 0.0 | Not Found | 0.17 |
| Ex. 11 | 1.12 | 34 | 0.87 | 1.51 | Not Detectable | 9 | 55 | 3 | 0.4 | Not Found | — |
| Ex. 12 | 0.47 | 28 | 0.93 | 1.62 | Not Detectable | <4 | 8 | 1 | 0.0 | Not Found | 0.16 |
| Comp. Ex. 1 | 0.46 | 34 | 0.90 | 1.62 | Not Detectable | 100 | 2400 | 3 | 0.6 | Found | — |
| Comp. Ex. 2 | 0.61 | 60 | 0.71 | 1.74 | 5 | — | — | 3 | 0.7 | Found | — |
| Comp. Ex. 3 | 0.47 | 28 | 0.93 | 1.62 | Not Detectable | 30 | 280 | 1 | 0.0 | Not Found | 0.09 |
| Comp. Ex. 4 | 0.43 | 25 | 0.91 | 1.62 | Not Detectable | 50 | 680 | 1 | 0.2 | Found | — |

TABLE 3-continued

| | Mean Particle Diameter (μm) | Coefficient of Diameter (%) | Sphericity (—) | Refractive Index (—) | Laser Diffraction Scattering Method (vol %) 5 μm or more | Amount of Coarse Particles by Coulter Counter Method (ppm) 5 μm or more | 3 μm or more | Heating Loss (%) | Amount of Isolated Silanol Group | Flow Mark | Carbon content (mass %) |
|---|---|---|---|---|---|---|---|---|---|---|---|
| Comp. Ex. 5 | 0.64 | 28 | 0.92 | 1.51 | Not Detectable | 35 | 320 | 1 | 0.2 | Found | — |
| Ex. 13 | 0.43 | 24 | 0.92 | 1.62 | Not Detectable | 8 | 32 | 1 | 0.2 | Not Found | — |

TABLE 4

| | α ray emission (c/(cm² · h)) | U (ppb) | Th (ppb) | Fe (ppm) | Al (ppm) | Na (ppm) | K (ppm) | Ca (ppm) | Cr (ppm) | Ni (ppm) | Cl⁻ (ppm) |
|---|---|---|---|---|---|---|---|---|---|---|---|
| Ex. 1 | 0.002 | 0.02 | 0.02 | 0.1 | 0.1 | 0.1 | 0.0 | 0.1 | 0.0 | 0.0 | 0.1 |
| Ex. 2 | 0.002 | 0.02 | 0.01 | 0.1 | 0.0 | 0.2 | 0.0 | 0.1 | 0.0 | 0.0 | 0.1 |
| Ex. 3 | 0.002 | 0.02 | 0.02 | 0.1 | 0.1 | 0.1 | 0.1 | 0.1 | 0.0 | 0.0 | 0.1 |
| Ex. 4 | 0.002 | 0.02 | 0.02 | 0.1 | 0.1 | 0.1 | 0.0 | 0.1 | 0.0 | 0.0 | 0.1 |
| Ex. 5 | 0.002 | 0.01 | 0.02 | 0.1 | 0.0 | 0.1 | 0.0 | 0.1 | 0.0 | 0.0 | 0.1 |
| Ex. 6 | 0.002 | 0.02 | 0.02 | 0.1 | 0.1 | 0.1 | 0.1 | 0.1 | 0.0 | 0.0 | 0.1 |
| Ex. 7 | 0.002 | 0.02 | 0.01 | 0.0 | 0.0 | 0.1 | 0.1 | 0.1 | 0.0 | 0.0 | 0.1 |
| Ex. 8 | 0.002 | 0.02 | 0.02 | 0.4 | 2.2 | 0.1 | 0.0 | 0.1 | 0.1 | 0.1 | 0.1 |
| Ex. 9 | 0.002 | 0.02 | 0.02 | 0.4 | 2.3 | 0.1 | 0.1 | 0.1 | 0.1 | 0.1 | 0.1 |
| Ex. 10 | 0.002 | 0.02 | 0.02 | 0.3 | 2.2 | 0.1 | 0.0 | 0.1 | 0.1 | 0.1 | 0.1 |
| Ex. 11 | 0.002 | 0.02 | 0.02 | 0.1 | 0.1 | 0.1 | 0.1 | 0.1 | 0.0 | 0.0 | 0.1 |
| Ex. 12 | 0.002 | 0.02 | 0.02 | 0.2 | 2.2 | 0.1 | 0.0 | 0.1 | 0.1 | 0.1 | 0.1 |
| Comp. Ex. 1 | 0.002 | 0.02 | 0.02 | 0.1 | 0.1 | 0.1 | 0.0 | 0.1 | 0.0 | 0.0 | 0.1 |
| Comp. Ex. 2 | 0.002 | 0.02 | 0.01 | 0.1 | 0.1 | 0.1 | 0.0 | 0.1 | 0.0 | 0.0 | 0.1 |
| Comp. Ex. 3 | 0.002 | 0.02 | 0.02 | 0.3 | 2.2 | 0.1 | 0.1 | 0.1 | 0.1 | 0.1 | 0.1 |
| Comp. Ex. 4 | 0.002 | 0.02 | 0.02 | 0.1 | 0.1 | 0.1 | 0.0 | 0.1 | 0.0 | 0.0 | 0.1 |
| Comp. Ex. 5 | 0.002 | 0.02 | 0.02 | 0.1 | 0.0 | 0.1 | 0.0 | 0.1 | 0.0 | 0.0 | 0.1 |
| Ex. 13 | 0.002 | 0.02 | 0.02 | 0.1 | 0.1 | 0.1 | 0.1 | 0.1 | 0.0 | 0.0 | 0.1 |

The invention claimed is:

1. A method for producing a silica-based composite oxide powder comprising a composite oxide of silicon and at least one metal selected from the group consisting of titanium and zirconium, the silica-based composite oxide powder having a volume-based cumulative 50% diameter measured by a laser diffraction scattering method in a range of 0.05 μm to 2.0 μm, and a coefficient of variation of 40% or less, wherein in a 5 mass % dispersion of the silica-based composite oxide powder obtained by ultrasonic irradiation (at an output of 40 W for 10 minutes), a content of particles having a particle diameter of 5 μm or more in a particle size distribution obtained by a Coulter counter method is 10 ppm or less on a number basis, the method comprising:

(1) preparing a partial hydrolysate of silicon alkoxide;

(2) mixing the partial hydrolysate with alkoxide of metal selected from the group consisting of titanium and zirconium or a mixture of the alkoxide of the metal and a complexing agent such that titanium or zirconium is mixed in a proportion of 50 mol % or less to a total amount of metal, thereby preparing a composite alkoxide material;

(3) hydrolyzing and condensing the composite alkoxide material in a dispersion medium containing water, thereby obtaining composite oxide particles;

(4) wet-filtering a dispersion of the composite oxide particles dispersed in the dispersion medium containing water using a filter medium having a pore size of 3 μm or more and 5 μm or less;

(5) adding a compound including at least one selected from the group consisting of carbon dioxide, ammonium carbonate, ammonium bicarbonate, and ammonium carbamate to the wet-filtered dispersion of the composite oxide particles to coagulate the composite oxide particles, thereby obtaining a coagulated composite oxide dispersion containing the coagulated composite oxide;

(6) separating the composite oxide particles from the coagulated composite oxide dispersion; and (7) drying the separated composite oxide particles.

2. The method of claim 1, further comprising:

(8) calcining the composite oxide particles obtained after the drying at 600° C. to 1200° C.

3. A method for producing a silica-based composite oxide powder comprising a composite oxide of silicon and at least one metal selected from the group consisting of titanium and zirconium, the silica-based composite oxide powder having a volume-based cumulative 50% diameter measured by a laser diffraction scattering method in a range of 0.05 μm to 2.0 μm, and a coefficient of variation of 40% or less, wherein in a 5 mass % dispersion of the silica-based composite oxide powder obtained by ultrasonic irradiation (at an output of 40

W for 10 minutes), a content of particles having a particle diameter of 3 μm or more in a particle size distribution obtained by a Coulter counter method is 10 ppm or less on a number basis, the method comprising:

(1) preparing a partial hydrolysate of silicon alkoxide;
(2) mixing the partial hydrolysate with alkoxide of metal selected from the group consisting of titanium and zirconium or a mixture of the alkoxide of the metal and a complexing agent such that titanium or zirconium is mixed in a proportion of 50 mol % or less to a total amount of metal, thereby preparing a composite alkoxide material;
(3) hydrolyzing and condensing the composite alkoxide material in a dispersion medium containing water, thereby obtaining composite oxide particles;
(4) wet-filtering a dispersion of the composite oxide particles dispersed in the dispersion medium containing water using a filter medium having a pore size of 3 μm or more and 5 μm or less;
(5) adding a compound including at least one selected from the group consisting of carbon dioxide, ammonium carbonate, ammonium bicarbonate, and ammonium carbamate to the wet-filtered dispersion of the composite oxide particles to coagulate the composite oxide particles, thereby obtaining a coagulated composite oxide dispersion containing the coagulated composite oxide;
(6) separating the composite oxide particles from the coagulated composite oxide dispersion; and
(7) drying the separated composite oxide particles.

4. The method of claim 3, further comprising:
(8) calcining the composite oxide particles obtained after the drying at 600° C. to 1200° C.

* * * * *